(12) United States Patent
Kusukame et al.

(10) Patent No.: US 7,869,120 B2
(45) Date of Patent: Jan. 11, 2011

(54) LASER WAVELENGTH CONVERSION DEVICE, METHOD FOR FORMING POLARIZATION REVERSED STRUCTURE, AND IMAGE DISPLAY DEVICE

(75) Inventors: Koichi Kusukame, Osaka (JP); Kiminori Mizuuchi, Osaka (JP); Tomoya Sugita, Nara (JP); Akihiro Morikawa, Ehime (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 12/121,451

(22) Filed: May 15, 2008

(65) Prior Publication Data

US 2008/0297690 A1    Dec. 4, 2008

(30) Foreign Application Priority Data

May 15, 2007    (JP) .............................. 2007-128919

(51) Int. Cl.
*G02F 1/35* (2006.01)
*G02F 2/02* (2006.01)
*H01S 3/10* (2006.01)

(52) U.S. Cl. ........................................ 359/326; 372/22
(58) Field of Classification Search ......... 359/326–332; 385/122; 372/21, 22
See application file for complete search history.

(56) References Cited

U.S. PATENT DOCUMENTS

| | | | | |
|---|---|---|---|---|
| 5,317,666 A | * | 5/1994 | Agostinelli et al. | 385/122 |
| 5,506,722 A | * | 4/1996 | Mizuuchi et al. | 359/332 |
| 5,875,053 A | * | 2/1999 | Webjorn et al. | 359/326 |
| 7,106,496 B2 | * | 9/2006 | Kurimura et al. | 359/326 |
| 7,230,753 B2 | * | 6/2007 | Mizuuchi et al. | 359/321 |
| 7,486,432 B2 | * | 2/2009 | Chu et al. | 359/321 |

FOREIGN PATENT DOCUMENTS

JP    2004-246332    9/2004

* cited by examiner

*Primary Examiner*—Daniel Petkovsek
(74) *Attorney, Agent, or Firm*—Wenderoth, Lind & Ponack, L.L.P.

(57) ABSTRACT

An object of the invention is to increase the beam diameter of a laser beam, and perform high-output wavelength conversion without causing crystal damage. A laser wavelength conversion device includes a laser wavelength conversion element for allowing incidence of a laser beam as a fundamental wave to convert a part of the fundamental wave laser beam into a wavelength-converted laser beam having a wavelength different from a wavelength of the fundamental wave laser beam. The laser wavelength conversion element includes a non-linear optical crystal having periodically polarization reversed portions. The polarization reversed portions are formed in such a manner that a region where a wavelength conversion efficiency is substantially uniform extends in a polarization direction of the non-linear optical crystal. The incident laser beam is converted into the wavelength-converted laser beam with the wavelength conversion efficiency.

20 Claims, 17 Drawing Sheets

LASER WAVELENGTH CONVERSION DEVICE, METHOD FOR FORMING POLARIZATION REVERSED STRUCTURE, AND IMAGE DISPLAY DEVICE

BACKGROUND OF THE INVENTION

1. Field of the Invention

The present invention relates to a laser wavelength conversion device incorporated with a laser wavelength conversion element, in which a polarization structure of a non-linear optical single crystal substrate is periodically reversed, and a method for forming a polarization reversed structure. The present invention also relates to an image display device incorporated with the laser wavelength conversion device.

2. Description of the Background Art

Applying an electric field to a single-polarized ferroelectric crystal in a direction opposite to a polarization direction enables to reverse the polarization direction of a portion where the electric field is applied. As recited in Japanese Unexamined Patent Publication No. 2004-246332, applying an electric field with use of a periodical electrode enables to alternately form a region where the polarization is reversed and a region where the polarization is not reversed, thereby enabling to form a periodically polarization reversed structure.

A ferroelectric crystal having the aforementioned periodically polarization reversed structure is operable to convert a fundamental wave laser beam, which is incident onto the ferroelectric crystal in a periodically reversed polarization direction, into a laser beam having a wavelength different from the wavelength of the incident fundamental wave. The ferroelectric crystal having the aforementioned periodically polarization reversed structure is widely used as a quasi phase matching (QPM) wavelength conversion element for converting the wavelength of a laser beam.

Also, in recent years, there is a demand for developing a high-output laser wavelength conversion technique capable of high-output laser output of several watts or more for laser display or laser processing.

It is highly likely that a laser beam of an unduly large light intensity may cause crystal damage or degradation in a wavelength conversion element. It is possible to suppress crystal damage or degradation by increasing the beam diameter of a laser beam to be used in wavelength conversion and suppressing an increase in light intensity. There is, however, a limit in increasing the width of polarization direction of a crystal capable of uniformly forming a periodically polarization reversed structure. Thus, increasing the width of polarization direction of a crystal has become a challenging task to perform.

FIG. 15 is a diagram for describing a process of forming a periodically polarization reversed structure in a conventional laser wavelength conversion element. FIG. 16 is a diagram showing the conventional laser wavelength conversion element having the periodically polarization reversed structure. FIG. 17 is a diagram showing relations between a position of a polarization direction and a wavelength conversion efficiency in the conventional laser wavelength conversion element.

As shown in FIG. 15, a polarization reversed region starts from a +Z surface 312 of a ferroelectric crystal 311, and spreads in lateral directions (X-directions) and in −Z direction. In the case where a periodically polarization reversed structure is formed by periodical electrodes 313 formed on the +Z surface 312, and an opposing electrode 315 formed on a −Z surface 314, wedge-shaped polarization reversed portions 316 are started to be formed at a position beneath the periodical electrodes 313. As an electric field is applied to the ferroelectric crystal 311, the polarization reversed portions 316 grow, and as shown in FIG. 16, distal ends 317 of the polarization reversed portions 316 reach close to the −Z surface 314.

As shown in FIG. 16, a laser beam 319 as a fundamental wave exiting from a light source 318 is incident onto the ferroelectric crystal 311 having the periodically polarization reversed structure in a periodically reversed polarization direction to convert a part of the laser beam 319 into a laser beam 320 having a wavelength different from the wavelength of the incident fundamental wave. When the above wavelength conversion is performed, a wavelength conversion efficiency σ depends on a ratio of the polarization reversed portions 316 and a polarization non-reversed portion 321 on a beam path of the fundamental wave. The wavelength conversion efficiency σ is maximum when the ratio is equal to 1:1. Specifically, assuming that the ratio of the polarization reversed portions 316 relative to the entirety of the wavelength conversion element is D (duty ratio [%]), the wavelength conversion efficiency σ is expressed by the following formula (1):

$$\sigma \propto \sin^2(D/100) \quad (1)$$

Further, the polarization reversed structure has a series of wedge shapes, as shown in FIG. 16, in other words, is expressed by a graph showing a monotonous increase or a monotonous decrease, with a Z-coordinate axis in horizontal axis and a duty ratio in vertical axis. The duty ratio is decreased from 100% to 0% in a direction from the +Z surface 312 of the crystal 311 to the −Z surface 314 thereof. Assuming that the thickness of the crystal 311 is 1 mm, as shown in FIG. 17, the wavelength conversion efficiency is maximum at a middle portion of the crystal 311 in Z-axis direction, and is reduced to about a half of the maximum at a position away from the middle portion in Z-axis direction by about ±250 μm.

The laser wavelength conversion element described in the above example is a laser wavelength conversion element having a period length of 7 μm. The ratio of the growing speed of the polarization reversed portion in Z-axis direction, and the growing speed of the polarization reversed portion in lateral direction is substantially the same among the polarization reversed portions. Accordingly, a half bandwidth of wavelength conversion efficiency of a laser wavelength conversion element having a shorter period is decreased in proportional to the period.

Similarly to the above, even in the case where a crystal with a thickness exceeding 1 mm is used, wedge shapes of a polarization reversed structure, in other words, the gradient of a graph having a Z-coordinate axis in horizontal axis and a duty ratio in vertical axis is not changed.

For the aforementioned reasons, even if a fundamental wave laser beam having a large beam diameter of several hundred micrometers or more is subjected to wavelength conversion, the region of the crystal subjected to high-efficiency wavelength conversion is limited. As a result, the beam diameter of a laser beam to be generated by wavelength conversion in Z-axis direction is limited.

In the case where wavelength conversion is performed by using a high-output laser, it is highly likely that the light intensity of an incident laser beam or a laser beam generated by wavelength conversion may be unduly increased, which may cause crystal damage or degradation. It is possible to suppress crystal damage or degradation by increasing the beam diameter of a laser beam to be used in wavelength conversion, and suppressing an increase in light intensity. There is, however, a limit in increasing the width of a crystal in Z-axis direction, while securely and uniformly forming a periodically polarization reversed structure. Accordingly, it is impossible to increase the beam diameter over the limit.

In the case where a green laser beam is obtained by subjecting an infrared laser beam to wavelength conversion, using a laser wavelength conversion element, an ultraviolet laser beam is generated by superimposing the green laser beam and the infrared laser beam. When the ultraviolet laser beam and the green laser beam are superimposed, the green laser beam is absorbed, and crystal damage may occur. In view of the above phenomenon, it is indispensable to reduce the infrared beam intensity by increasing the beam diameter in order to realize high-output performance, because generally, the intensity of green beam is proportional to the square of the incident beam intensity, and the intensity of ultraviolet beam is proportional to the third power of the incident beam intensity.

SUMMARY OF THE INVENTION

In view of the above problems residing in the conventional examples, it is an object of the present invention to provide a laser wavelength conversion device, a polarization reversed structure forming method, and an image display device that enable to increase the beam diameter of a laser beam and perform high-output wavelength conversion without causing crystal damage.

A laser wavelength conversion device according to an aspect of the invention includes a laser wavelength conversion element for allowing incidence of a laser beam as a fundamental wave to convert a part of the fundamental wave laser beam into a wavelength-converted laser beam having a wavelength different from a wavelength of the fundamental wave laser beam. The laser wavelength conversion element includes a non-linear optical crystal having periodically polarization reversed portions. The polarization reversed portions are formed in such a manner that a region where a wavelength conversion efficiency is substantially uniform extends in a polarization direction of the non-linear optical crystal. The incident laser beam is converted into the wavelength-converted laser beam with the wavelength conversion efficiency.

A method for forming a polarization reversed structure according to another aspect of the invention includes: an electrode forming step of periodically forming a plurality of electrodes on one surface of a single-polarized non-linear optical crystal, and forming a plane electrode on the other surface thereof; and a polarization reversed structure forming step of forming a polarization reversed structure immediately below each of the periodical electrodes by applying an electric field between the periodical electrodes and the plane electrode, wherein, in the polarization reversed structure forming step, at least one of an intensity of the electric field to be applied between the periodical electrodes and the plane electrode, an application time, and a crystal forming temperature during the electric field application is independently controlled.

An image display device according to yet another aspect of the invention includes: a screen; a laser light source; and an optical system for forming an image on the screen by using the laser light source, wherein the laser light source includes a fundamental wave laser light source for emitting a fundamental wave laser beam, and the aforementioned laser wavelength conversion device for converting a part of the fundamental wave laser beam to be emitted from the fundamental wave laser light source into the laser beam having a wavelength different from a wavelength of the fundamental wave laser beam.

An image display device according to still another aspect of the invention includes: a liquid crystal display panel; and a backlight illuminator including a laser light source, and operable to illuminate the liquid crystal display panel from a rear surface thereof, wherein the laser light source includes a fundamental wave laser light source for emitting a fundamental wave laser beam, and the aforementioned laser wavelength conversion device for converting a part of the fundamental wave laser beam to be emitted from the fundamental wave laser light source into the laser beam having a wavelength different from a wavelength of the fundamental wave laser beam.

These and other objects, features and advantages of the present invention will become more apparent upon reading the following detailed description along with the accompanying drawings.

DETAILED DESCRIPTION OF THE PREFERRED EMBODIMENTS OF THE INVENTION

In the following, embodiments of the invention are described referring to the accompanying drawings. The following embodiments are merely examples embodying the invention, and do not limit the technical scope of the invention.

Figure 16:
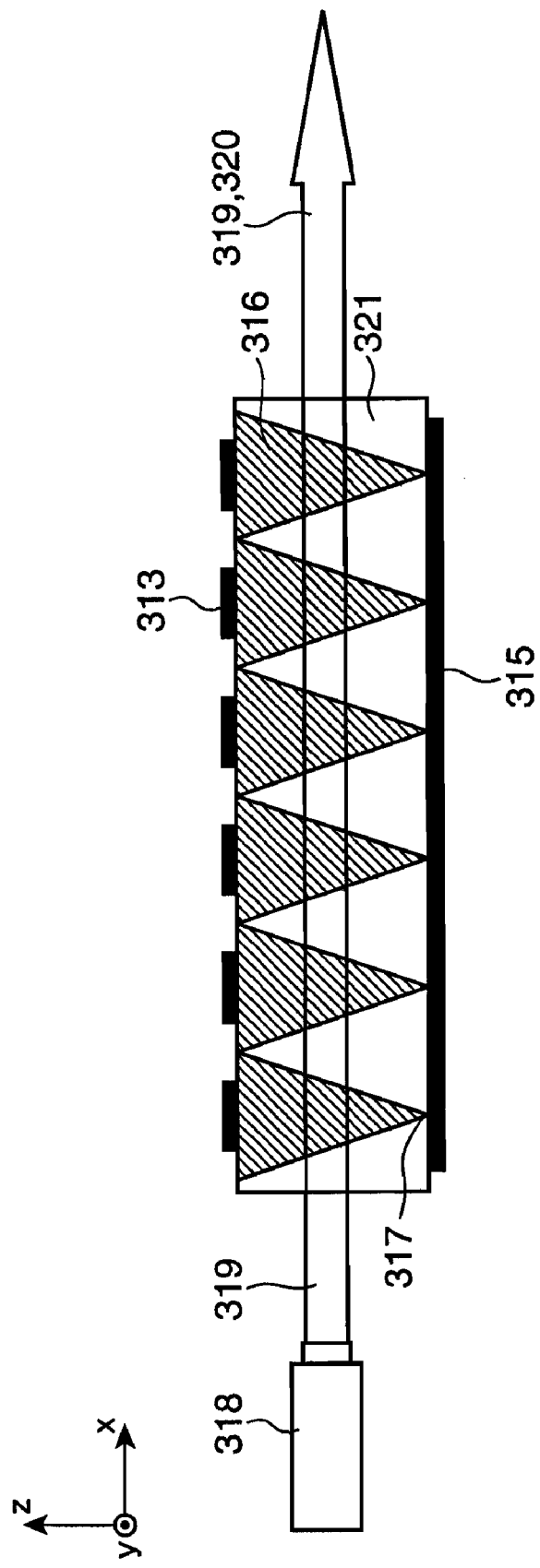
FIG. 16 is a diagram showing the conventional laser wavelength conversion element having the periodically polarization reversed structure.
Figure 17:
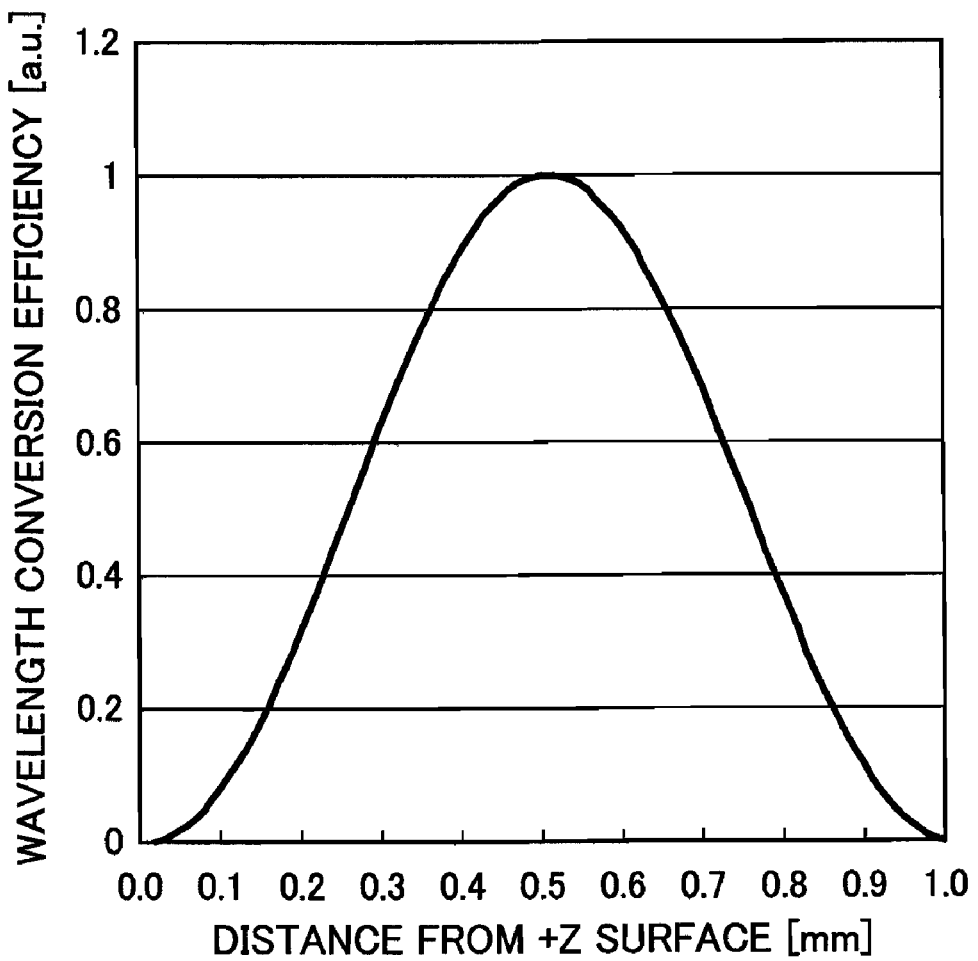
FIG. 17 is a diagram showing relations between a position of a polarization direction and a wavelength conversion efficiency in the conventional laser wavelength conversion element.

Conventionally, wavelength conversion has been performed by using the arrangement as shown in FIG. 16 to maximize the wavelength conversion efficiency. Specifically, in the conventional arrangement, a center of a fundamental wave laser beam, corresponding to an optical axis, is allowed to pass exclusively through a region of the laser wavelength conversion element where the duty ratio is about 50%. The duty ratio is a ratio of polarization reversed portions in the laser wavelength conversion element relative to the entirety of the laser wavelength conversion element in the optical axis direction.

The wavelength conversion efficiency is increased in proportional to the output of a fundamental wave laser beam. Accordingly, in the case where laser display or laser processing requiring laser wavelength conversion of several watts or more is performed, the output of the fundamental wave laser beam to be incident onto the laser wavelength conversion element is large. Therefore, there is less need of securing high efficiency by aligning position where the duty ratio is substantially 50% in a certain direction.

In view of the above, distributing positions where the duty ratio is substantially 50% with respect to the beam path of an incident beam is advantageous in suppressing crystal damage or degradation resulting from an increase in light intensity in performing high-output wavelength conversion.

First Embodiment

Figure 1:
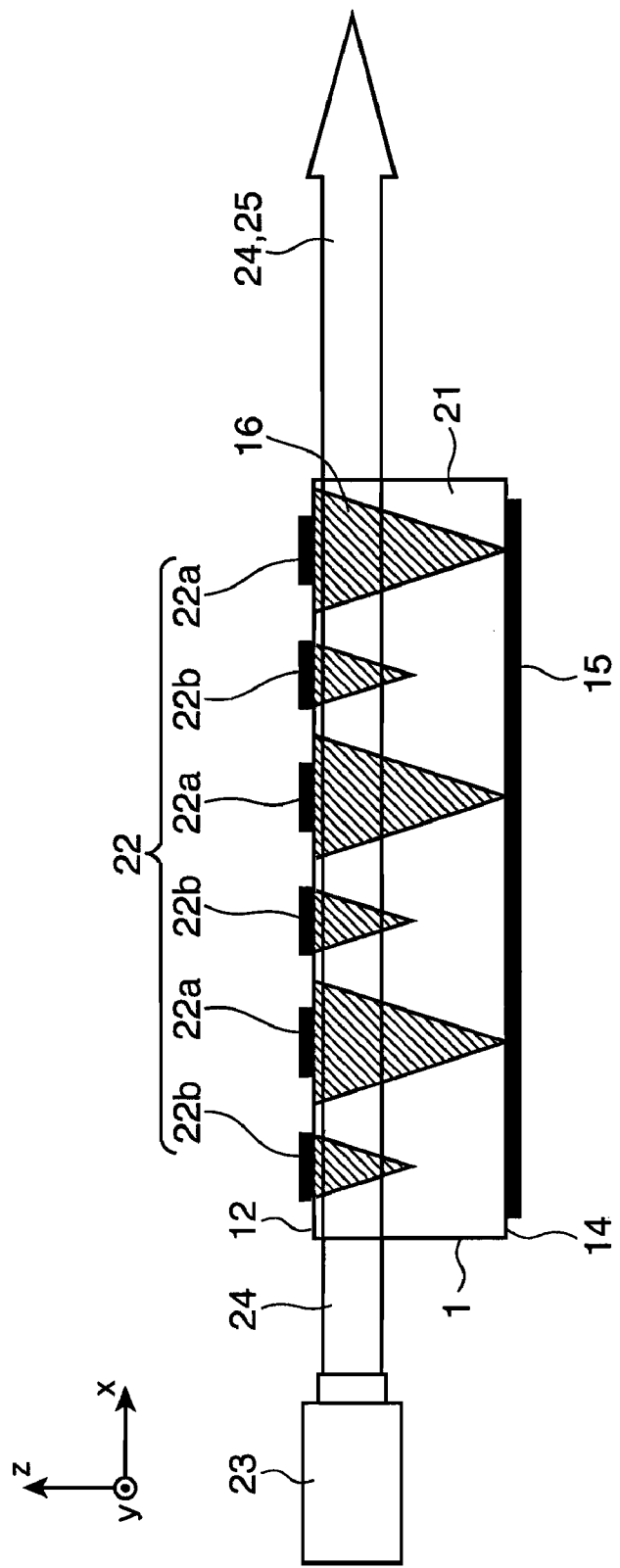
FIG. 1 is a diagram showing an arrangement of a laser wavelength conversion device in accordance with a first embodiment of the invention.

FIG. 1 is a diagram showing an arrangement of a laser wavelength conversion device in accordance with the first embodiment of the invention. In the first embodiment, as recited in the conventional art (see e.g. Japanese Unexamined Patent Publication No. 2004-246332), an electric field is applied to a single-polarized ferroelectric substrate via a periodical electrode unit 22 formed on a +Z surface 12 of a ferroelectric crystal, and an opposing electrode 15 formed on a −Z surface 14 thereof to form a periodically polarization reversed structure. As shown in FIG. 1, the periodical electrode unit 22 is divided into first periodical electrodes 22a and second periodical electrodes 22b so that intensities of an electric field to be applied to the first and the second periodical electrodes 22a and 22b, or electric field application times are independently controlled. The above arrangement enables to independently adjust the depths of polarization reversed portions 16 to be formed at a position beneath the first periodical electrodes 22a and the second periodical electrodes 22b.

In the specification, Z-axis direction shown in FIG. 1 i.e. a direction substantially perpendicular to the optical axis and in which the polarization reversed portions are formed is defined as a polarization direction, and X-axis direction is defined as an optical axis direction.

The laser wavelength conversion device shown in FIG. 1 includes a laser wavelength conversion element 1 for allowing incidence of a laser beam 24 as a fundamental wave, and converting a part of the laser beam 24 into a laser beam 25 having a wavelength different from the wavelength of the incident fundamental wave. The laser wavelength conversion element 1 is made of a non-linear optical crystal, in which polarization reversed portions (hereinafter, also called as "polarization reversed regions") 16 are periodically formed. The polarization reversed portions 16 are formed in such a manner that a region where the wavelength conversion efficiency with which the incident laser beam 24 is converted into the laser beam 25 is substantially uniform extends in the polarization direction of the non-linear optical crystal. The first periodical electrodes 22a and the second periodical electrodes 22b are alternately formed in the optical axis direction of a laser beam passing through the laser wavelength conversion element 1.

When a control voltage is applied between the periodical electrode unit 22 and the opposing electrode 15 by an unillustrated pulse generator, polarization reversed regions are formed in a ferroelectric portion between the periodical electrode unit 22 and the opposing electrode 15. The control voltage is a pulse voltage or a direct-current voltage having a predetermined voltage level or a predetermined energization time.

In the first embodiment, a first switch is provided between the pulse generator and the first periodical electrodes 22a, and a second switch is provided between the pulse generator and the second periodical electrodes 22b. After the first switch is turned on and the second switch is turned off, when a voltage is applied by the pulse generator, the polarization reversed portions 16 are formed exclusively at a position beneath the first periodical electrodes 22a. On the other hand, after the first switch is turned off and the second switch is turned on, when a voltage is applied by the pulse generator, the polarization reversed portions 16 are formed exclusively at a position beneath the second periodical electrodes 22b.

As shown in FIG. 1, in the first embodiment, distal ends of the polarization reversed regions to be formed at a position beneath the first periodical electrodes 22a reach the −Z surface 14, and the duty ratio of the polarization reversed regions near the +Z surface 12 is substantially equal or close to 100%. On the other hand, distal ends of the polarization reversed regions to be formed at a position beneath the second periodical electrodes 22b reach at most a position substantially a half of the thickness of the substrate, and the duty ratio of the polarization reversed regions near the +Z surface 12 is substantially or close to 50%. The polarization reversed portions 16 to be formed in the laser wavelength conversion element 1 each has a wedge shape, with the distal ends thereof being alternately displaced from each other in the polarization direction.

Figure 2:
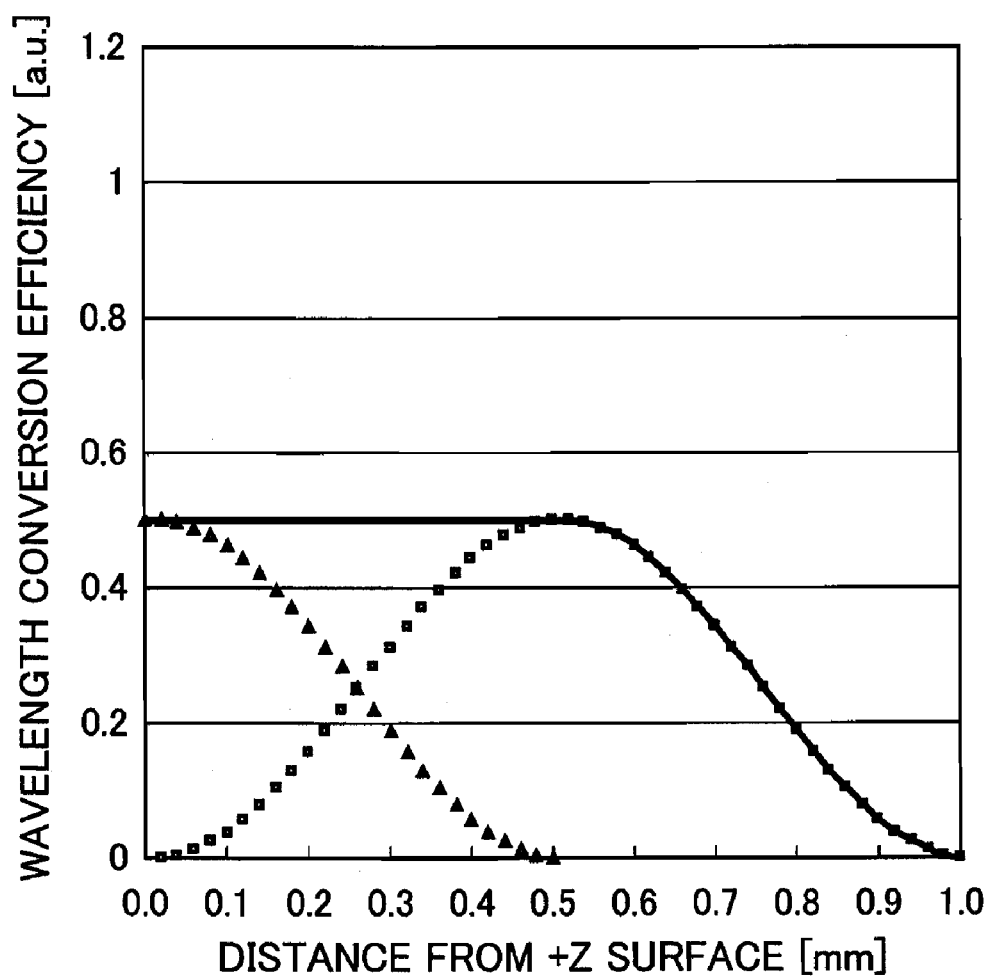
FIG. 2 is a diagram showing relations between a distance from a +Z surface of a laser wavelength conversion element in the first embodiment, and a wavelength conversion efficiency.

In the above arrangement, the wavelength conversion efficiency to be obtained by the periodical polarization reversed portions to be formed at a position beneath the first periodical electrodes 22a and the second periodical electrodes 22b has different peak positions, as shown in FIG. 2. FIG. 2 is a diagram showing relations between a distance from the +Z surface of the laser wavelength conversion element in the first embodiment, and a wavelength conversion efficiency. Referring to FIG. 2, the square-dotted line represents a wavelength conversion efficiency to be obtained by the polarization reversed portions to be formed at a position beneath the first periodical electrodes 22a, the triangle-dotted line represents a wavelength conversion efficiency to be obtained by the polarization reversed portions to be formed at a position beneath the second periodical electrodes 22b, and the solid line represents a wavelength conversion efficiency to be obtained by the laser wavelength conversion element in the first embodiment.

The laser wavelength conversion element in the first embodiment enables to extend the region where the wavelength conversion efficiency is substantially uniform, as shown in FIG. 2, by summing up the wavelength conversion efficiency to be obtained by the polarization reversed portions to be formed at a position beneath the first periodical electrodes 22a, and the wavelength conversion efficiency to be obtained by the polarization reversed portions to be formed at a position beneath the second periodical electrodes 22b.

Specifically, the wavelength conversion efficiency to be obtained by the polarization reversed portions to be formed at a position beneath the second periodical electrodes 22b is maximum when the distance from the +Z surface 12 is 0 mm; is decreased, as the distance from the +Z surface 12 is increased; and is 0, when the distance from the +Z surface 12 is 0.5 mm. On the other hand, the wavelength conversion efficiency to be obtained by the polarization reversed portions to be formed at a position beneath the first periodical electrodes 22a is 0 when the distance from the +Z surface 12 is 0 mm; is increased, as the distance from the +Z surface 12 is increased; is maximum, when the distance from the +Z surface 12 is 0.5 mm; is decreased as the distance from the +Z surface 12 is increased; and is 0, when the distance from the +Z surface 12 is 1.0 mm.

By summing up the wavelength conversion efficiency to be obtained by the polarization reversed portions 16 to be formed at a position beneath the first periodical electrodes 22a, and the wavelength conversion efficiency to be obtained by the polarization reversed portions 16 to be formed at a position beneath the second periodical electrodes 22b, the wavelength conversion efficiency of the laser wavelength conversion element 1 in the first embodiment is maximum when the distance from the +Z surface 12 is in the range from 0 mm to 0.5 mm.

As described above, the polarization reversed portions 16 are formed in such a manner that the positions where the wavelength conversion efficiency with which the incident laser beam is converted into a laser beam having a wavelength different from the wavelength of the incident laser beam is maximum are distributed in the polarization direction of the non-linear optical crystal with respect to the beam path of the incident beam passing through the non-linear optical crystal. In other words, the polarization reversed portions 16 are formed in such a manner that the positions where the duty ratio representing the ratio of the polarization reversed portions 16 relative to the entirety of the non-linear optical crystal in the optical axis direction of the laser beam is 50% are distributed in the polarization direction of the non-linear optical crystal with respect to the beam path of the incident beam passing through the non-linear optical crystal. The duty ratio is not necessarily 50%, but may include a certain allowable range of error e.g. ±3%.

The duty ratio of the laser wavelength conversion element 1 is not fixed on a plane substantially perpendicular to the polarization direction of the non-linear optical crystal.

In the above arrangement, in the case where the fundamental wave laser beam 24 is incident from a fundamental wave laser light source 23, the laser wavelength conversion element 1 is operable to convert the fundamental wave laser beam 24, whose beam diameter in the laser wavelength conversion element 1 is about several hundred micrometers, into the laser beam 25 having a wavelength different from the wavelength of the fundamental wave laser beam 24. This arrangement enables to suppress crystal degradation or damage resulting from an increase in light intensity in performing high-output wavelength conversion.

Figure 3:
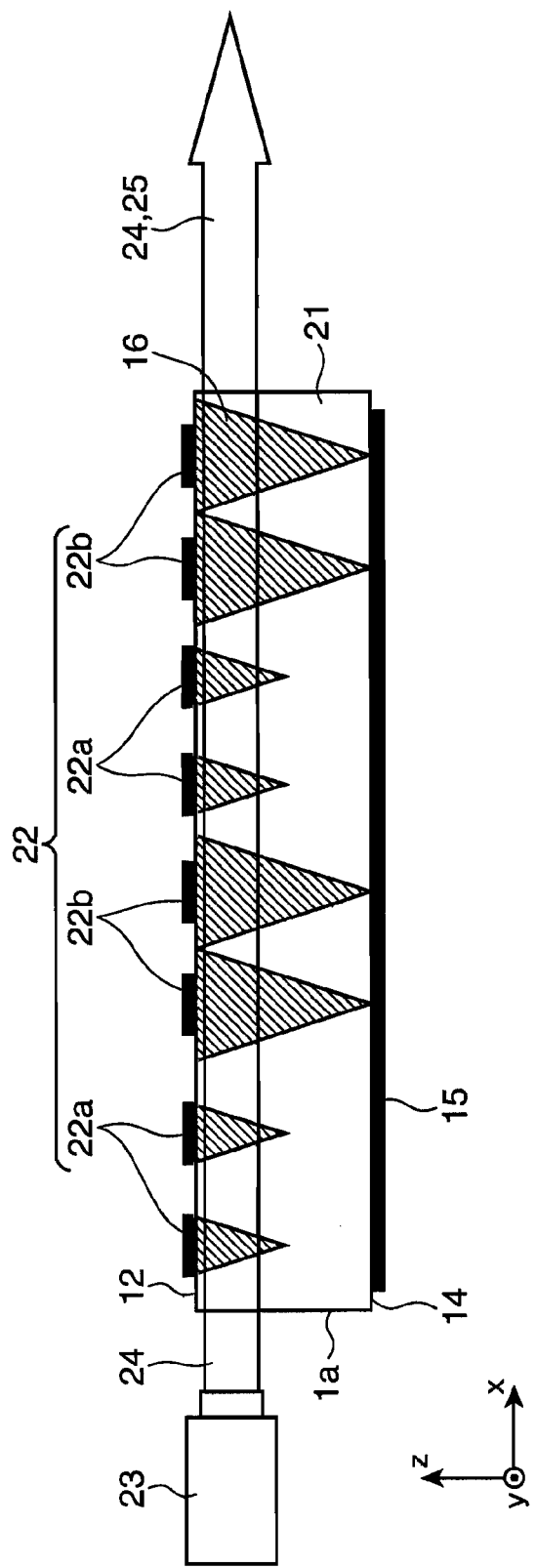
FIG. 3 is a diagram showing an arrangement of a laser wavelength conversion device as a first modification of the first embodiment.

Alternatively, as shown in FIG. 3, it is possible to fabricate a laser wavelength conversion element having substantially the same effect as described above by alternately forming a certain number of first periodical electrodes 22a and a certain number of second periodical electrodes 22b.

FIG. 3 is a diagram showing an arrangement of a laser wavelength conversion device as a first modification of the first embodiment. As shown in FIG. 3, the laser wavelength conversion device as the first modification of the first embodiment includes a laser wavelength conversion element 1a. The laser wavelength conversion element 1a has a periodical electrode unit 22 on a +Z surface 12, and an opposing electrode 15 on a −Z surface 14. The periodical electrode unit 22 is constituted of first periodical electrodes 22a and second periodical electrodes 22b. Specifically, each two of the first periodical electrodes 22a, and each two of the second periodical electrodes 22b are alternately arranged in the optical axis direction of a laser beam 24 to be incident onto the laser wavelength conversion element 1a.

When a control voltage is applied between the periodical electrode unit 22 and the opposing electrode 15 by an unillustrated pulse generator, polarization reversed regions are formed in a ferroelectric portion between the periodical electrode unit 22 and the opposing electrode 15. The control voltage is a pulse voltage or a direct-current voltage having a predetermined voltage level or a predetermined energization time.

In the first modification of the first embodiment, a first switch is provided between the pulse generator and the first periodical electrodes 22a, and a second switch is provided between the pulse generator and the second periodical electrodes 22b. After the first switch is turned on and the second switch is turned off, when a voltage is applied to the laser wavelength conversion element 1a, polarization reversed portions 16 are formed exclusively at a position beneath the first periodical electrodes 22a. On the other hand, after the first switch is turned off and the second switch is turned on, when a voltage is applied to the laser wavelength conversion element 1a, the polarization reversed portions 16 are formed exclusively at a position beneath the second periodical electrodes 22b.

Figure 4:
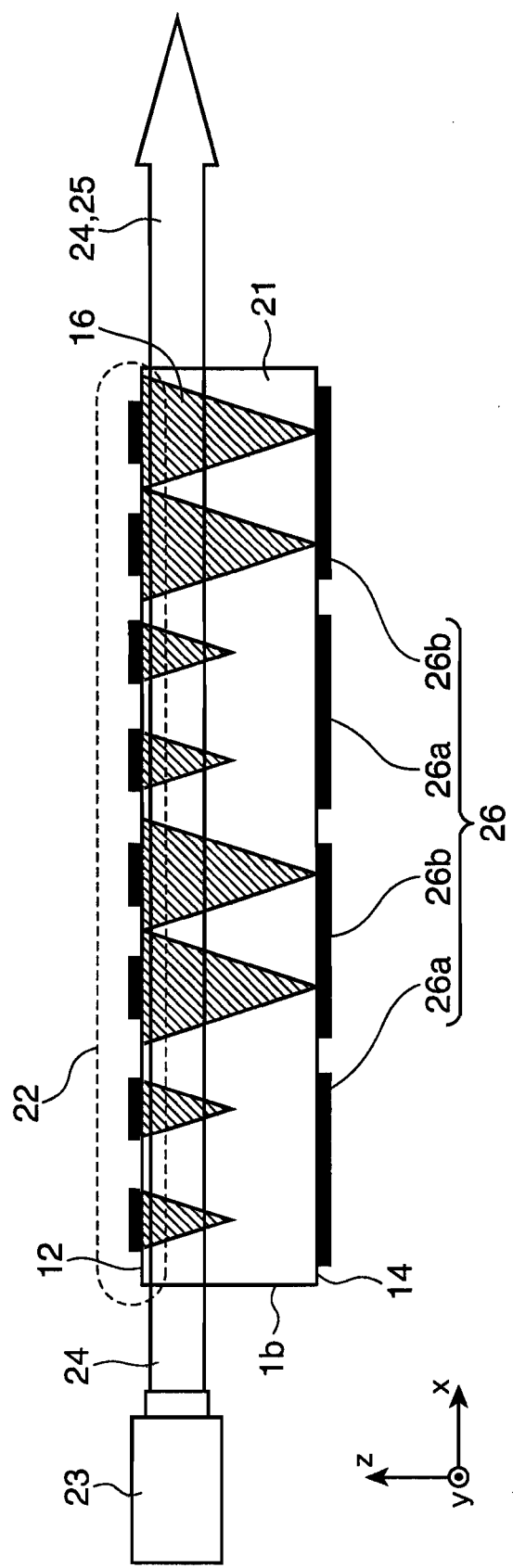
FIG. 4 is a diagram showing an arrangement of a laser wavelength conversion device as a second modification of the first embodiment.

Further alternatively, as shown in FIG. 4, it is possible to fabricate a laser wavelength conversion element having substantially the same effect as described above by dividing an opposing electrode unit 26 into first opposing electrodes 26a and second opposing electrodes 26b so that intensities of an electric field to be applied to the first and the second opposing electrodes 26a and 26b, or electric field application times are independently controlled.

FIG. 4 is a diagram showing an arrangement of a laser wavelength conversion device as a second modification of the first embodiment. As shown in FIG. 4, the laser wavelength conversion device as the second modification of the first embodiment includes a laser wavelength conversion element 1b. The laser wavelength conversion element 1b has a periodical electrode unit 22 on a +Z surface 12, and an opposing electrode unit 26 on a −Z surface 14. The opposing electrode unit 26 is constituted of the first opposing electrodes 26a and the second opposing electrodes 26b. Specifically, the first opposing electrode 26a and the second opposing electrode 26b are alternately arranged in the optical axis direction of a laser beam 24 to be incident onto the laser wavelength conversion element 1b.

When a control voltage is applied by an unillustrated pulse generator between the periodical electrode unit 22 and the opposing electrode unit 26, polarization reversed regions are formed in a ferroelectric portion between the periodical electrode unit 22 and the opposing electrode unit 26. The control voltage is a pulse voltage or a direct-current voltage having a predetermined voltage level or a predetermined energization time.

In the second modification of the first embodiment, a first switch is provided between the pulse generator and the first opposing electrodes 26a, and a second switch is provided between the pulse generator and the second opposing electrodes 26b. After the first switch is turned on and the second switch is turned off, when a voltage is applied by the pulse generator, polarization reversed portions 16 are formed exclusively at a position over the first opposing electrodes 26a. On the other hand, after the first switch is turned off and the second switch is turned on, when a voltage is applied by the pulse generator, the polarization reversed portions 16 are formed exclusively at a position over the second opposing electrodes 26b.

Figure 5:
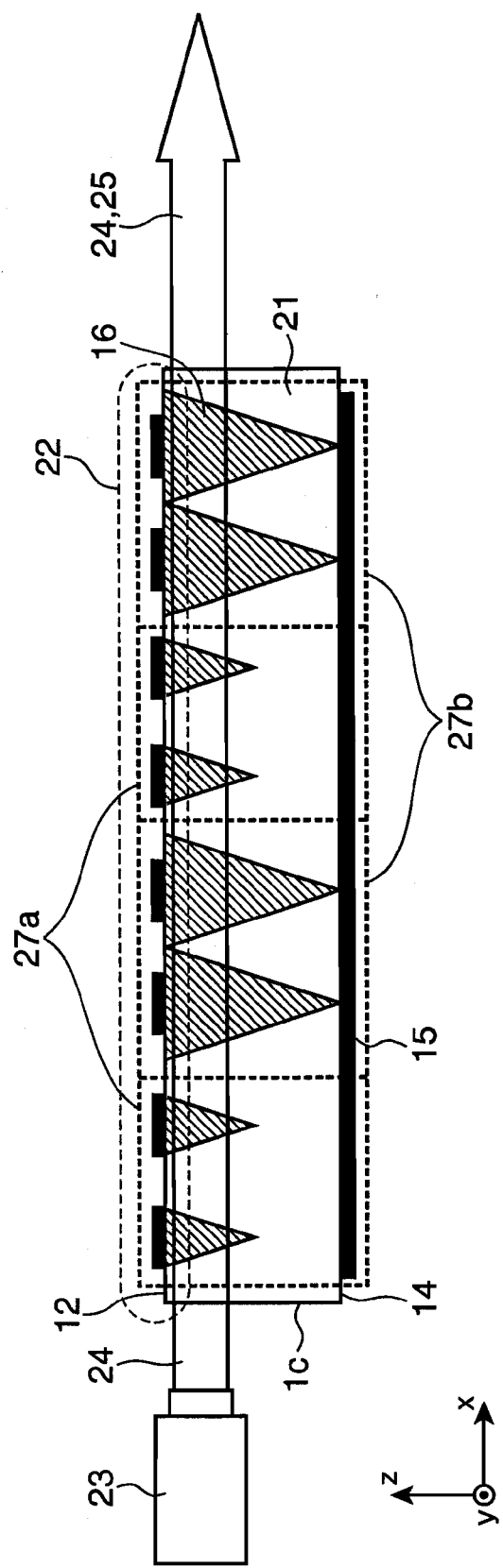
FIG. 5 is a diagram showing an arrangement of a laser wavelength conversion device as a third modification of the first embodiment.

Further alternatively, as shown in FIG. 5, it is possible to fabricate a laser wavelength conversion element having substantially the same effect as described above by using a periodical electrode unit and an opposing electrode in the similar manner as the conventional arrangement except that a temperature during an electric field application is changed between a first region 27a, and a second region 27b other than the first region 27a.

FIG. 5 is a diagram showing an arrangement of a laser wavelength conversion device as a third modification of the first embodiment. As shown in FIG. 5, the laser wavelength conversion device as the third modification of the first embodiment includes a laser wavelength conversion element 1c. The laser wavelength conversion element 1c has a periodical electrode unit 22 on a +Z surface 12, and an opposing electrode 15 on a −Z surface 14. The laser wavelength conversion element 1c is divided into first regions 27a each of which is kept at a first temperature, and second regions 27b each of which is kept at a second temperature different from the first temperature, in the optical axis direction of a laser beam 24 to be incident onto the laser wavelength conversion element 1c. The first region 27a and the second region 27b are alternately formed in the optical axis direction, with each two of periodical electrodes of the periodical electrode unit 22 being formed on a +Z surface 12 of each of the first and the second regions 27a and 27b.

When a control voltage is applied by an unillustrated pulse generator between the periodical electrodes of the periodical electrode unit 22, and the opposing electrode 15, polarization reversed regions are formed in a ferroelectric portion between the periodical electrode unit 22 and the opposing electrode 15. The control voltage is a pulse voltage or a direct-current voltage having a predetermined voltage level or a predetermined energization time.

In the third modification of the first embodiment, the first regions 27a and the second region 27b are kept at the first and the second temperatures, respectively. When a voltage is applied by the pulse generator, polarization reversed portions 16 having a length different from each other between the first regions 27a and the second regions 27b are alternately formed.

In the third modification of the first embodiment, an electric field is applied simultaneously to the first regions 27a and the second regions 27b. Alternatively, the entirety of the laser wavelength conversion element 1c may be kept at the first temperature, and an electric field is applied exclusively to periodical electrodes of the periodical electrode unit 22 in the first regions 27a. Thereafter, the entirety of the laser wavelength conversion element 1c may be kept at the second temperature, and an electric field may be applied exclusively to periodical electrodes of the periodical electrode unit 22 in the second regions 27b.

Figure 6:
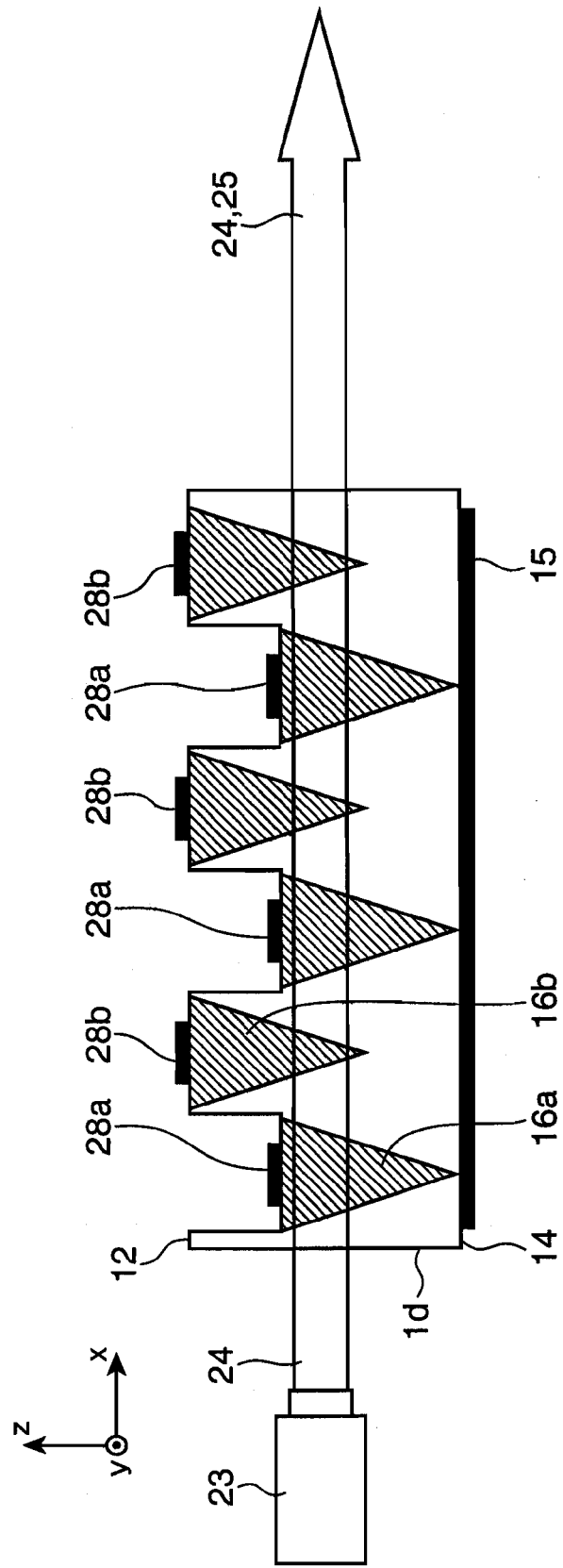
FIG. 6 is a diagram showing an arrangement of a laser wavelength conversion device as a fourth modification of the first embodiment.

Further alternatively, as shown in FIG. 6, electrodes, with a distance to an opposing electrode being different from each other between first periodical electrodes 28a and second periodical electrodes 28b, may be periodically formed. Thereby, even in the case where polarization reversed portions to be formed at a position beneath the first periodical electrodes 28a and the second periodical electrodes 28b are displaced from each other in Z direction, the wavelength conversion efficiency has the distribution, as shown in FIG. 2, at the polarization reversed regions to be formed at a position beneath the first periodical electrodes 28a and the second periodical electrodes 28b.

FIG. 6 is a diagram showing an arrangement of a laser wavelength conversion device as a fourth modification of the first embodiment. As shown in FIG. 6, the laser wavelength conversion device as the fourth modification of the first embodiment includes a laser wavelength conversion element 1d. Asperities are formed on a +Z surface 12 of the laser wavelength conversion element 1d in the optical axis direction of a laser beam 24 to be incident onto the laser wavelength conversion element 1d. The first periodical electrodes 28a are formed in recessed portions of the +Z surface 12, and the second periodical electrodes 28b are formed on protruded portions of the +Z surface 12. An opposing electrode 15 is formed on a −Z surface 14.

Distal ends of polarization reversed portions 16a to be formed at a position beneath the first periodical electrodes 28a reach the opposing electrode 15. The length of the polarization reversed portions 16b to be formed at a position beneath the second periodical electrodes 28b is substantially the same as the length of the polarization reversed portions 16a. However, since the second periodical electrodes 28b are formed at the positions corresponding to the protruded portions of the +Z surface 12, the distal ends of the polarization reversed portions 16b do not reach the opposing electrode 15.

When a control voltage is applied by an unillustrated pulse generator between the first and the second periodical electrodes 28a and 28b, and the opposing electrode 15, polarization reversed regions are formed in a ferroelectric portion between the first and the second periodical electrodes 28a and 28b, and the opposing electrode 15. The control voltage is a pulse voltage or a direct-current voltage having a predetermined voltage level or a predetermined energization time.

In the fourth modification of the first embodiment, when a voltage is applied by the pulse generator simultaneously to the first periodical electrodes 28a and the second periodical electrodes 28b, the polarization reversed portions 16a and the polarization reversed portions 16b are formed at the positions beneath the first periodical electrodes 28a and the second periodical electrodes 28b, respectively. When the distal ends of the polarization reversed portions 16a to be formed at a position beneath the first periodical electrodes 28a reach the opposing electrode 15, the voltage application is ended.

As described above, laser beam wavelength conversion is performed by using the laser wavelength conversion element having the polarization reversed structure. Specifically, a fundamental wave laser beam 24 exiting from a fundamental wave laser light source 23 are allowed to pass through upper portions of the polarization reversed portions 16a and lower portions of the polarization reversed portions 16b, whereby a laser beam 25 having a wavelength different from the wavelength of the fundamental wave laser beam 24 is generated.

In the foregoing, the laser wavelength conversion element and the laser wavelength conversion element fabricating method in accordance with the first embodiment are described, based on a method for forming a periodically polarization reversed structure using a periodical electrode unit in the similar manner as the conventional art. However, it is needless to say that the above description is applicable to a method for applying an electric field to a single-polarized ferroelectric member to form a periodically polarization reversed structure. Further alternatively, even in the case where a technique of forming a deeper and finer polarization reversed structure is established in the future, it is possible to extend the region where the wavelength conversion efficiency is substantially uniform in Z direction by employing the polarization reversed structure forming method in the first embodiment.

FIG. 2 shows a wavelength conversion efficiency distribution with respect to Z-coordinate, in the case where the Z-coordinate position where the duty ratio of the polarization reversed portions to be formed at a position beneath the periodical electrodes is substantially 50% is displaced by 500 μm between the first periodical electrodes and the second periodical electrodes. Alternatively, three or more kinds of periodical electrodes may be used, and the Z-coordinate position where the duty ratio is substantially 50% may be displaced by 500 μm or more, or 500 μm or less.

A smaller displacement in the Z-coordinate position where the duty ratio is substantially 50%, with use of three or more kinds of periodical electrodes, enables to increase the wavelength conversion efficiency. On the contrary, a larger displacement in the Z-coordinate position where the duty ratio is substantially 50%, with use of three or more kinds of periodical electrodes, enables to extend the region where the wavelength conversion efficiency is substantially uniform, thereby enabling to perform high-output wavelength conversion. In view of this, it is desirable to adjust the displacement amount or the displacement degree in the Z-coordinate position where the duty ratio is substantially 50% in accordance with the output of the laser beam to be subjected to wavelength conversion.

The maximum output of a green laser beam to be generated is increased by four times, nine times, or sixteen times by increasing the beam diameter of the fundamental wave laser beam to be incident for wavelength conversion from about 100 μm to about 200 μm, or to about 300 μm, or to about 400 μm. Unlike the conventional arrangement, in which crystal damage may have occurred when the output exceeds 2 watts or more, the above arrangement enables to generate a 8-watt green laser beam, necessary for laser projector, generate a green laser beam of about 18 watts, necessary for laser liquid display, or generate a green laser beam of about 30 watts, necessary for laser processing.

In view of the above, it is desirable to set the wavelength conversion efficiency in region, where the fundamental wave laser beams with the beam diameter of 200 μm or more, 300 μm or more, and 400 μm or more is allowed to be incident, substantially equal to each other, and to set distribution widths, in Z direction, of the positions where the duty ratio is substantially 50%, to 100 μm or more, 150 μm or more, and 200 μm or more, respectively. In the aforementioned conditions, it is desirable that the region having the duty ratio of substantially 50% occupy 20% or more relative to the entirety of the wavelength conversion element, at positions displaced from the average value of the Z-coordinate where the duty ratio is substantially 50% in +Z direction by 50 μm, 75 μm, and 100 μm, respectively. Likewise, it is desirable that the region having the duty ratio of substantially 50% occupy 20% or more relative to the entirety of the wavelength conversion element, at positions displaced from the average value in −Z direction by 50 μm, 75 μm, and 100 μm, respectively.

As described above, the region where the duty ratio is substantially 50% occupy 20% or more relative to the entirety of the wavelength conversion element, at the positions displaced from the average position obtained by averaging the positions where the duty ratio is substantially 50% in the polarization direction, by 50 μm or more toward a first plane where the polarization reversed portions are started to be formed. Also, the region where the duty ratio is substantially 50% occupy 20% or more relative to the entirety of the wavelength conversion element, at the positions displaced from the average position obtained by averaging the positions where the duty ratio is substantially 50% in the polarization direction, by 50 μm or more toward a second plane opposing to the first plane. By satisfying the above requirements, the wavelength conversion efficiency of a laser beam passing through the laser wavelength conversion element can be made substantially uniform in the polarization direction.

Considering that the polarization reversed regions have wedge-shapes, the aforementioned requirements mean that the region have a duty ratio deviation of 10% or more, 15% or more, or 20% or more on the center of a beam path corresponding to the optical axis; and that the region where the duty ratio is smaller than the average duty ratio on the beam path center by 5% or more, 7.5% or more, or 10% or more, and the region where the duty ratio is larger than the average duty ratio by 5% or more, 7.5% or more, or 10% or more, respectively occupy 20% or more relative to the entirety of the wavelength conversion element in the lengthwise direction thereof.

Figure 7:
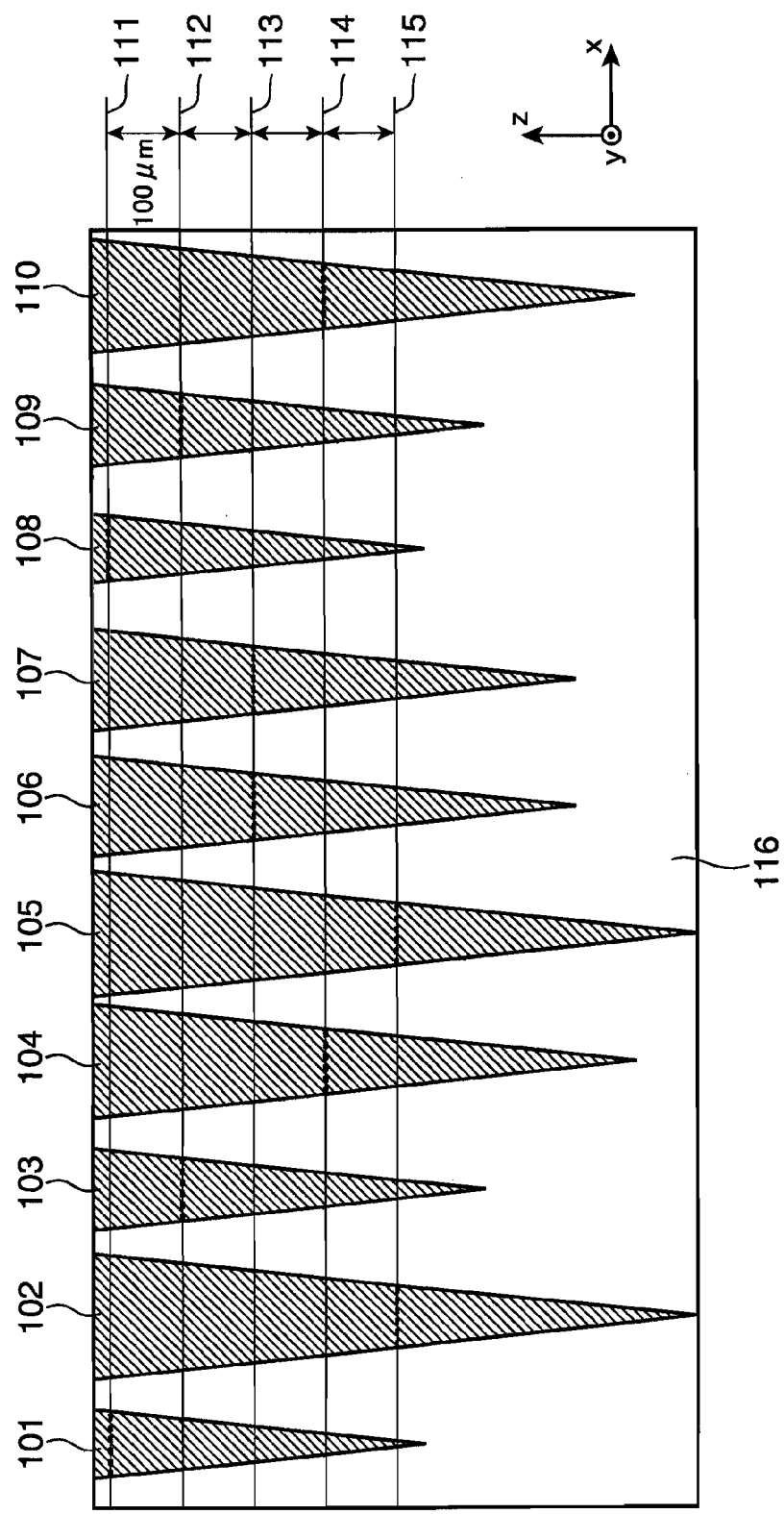
FIG. 7 is a diagram for describing a method for evaluating a polarization reversed structure.

In the following, a method for evaluating whether the fabricated laser wavelength conversion elements satisfy the requirements on an intended duty ratio distribution is described. FIG. 7 is a diagram for describing a method for evaluating a polarization reversed structure.

As a method for evaluating whether a laser wavelength conversion element satisfies the requirements on an intended duty ratio distribution, there is proposed a method comprising: cutting a laser wavelength conversion element on a plane substantially perpendicular to Z-direction and including a beam path; optically polishing the plane; and etching. As shown in FIG. 7, hydrofluoric acid is used in the etching. The etching is performed for 1 hour at a normal temperature. As shown in FIG. 7, a difference in etching rate between polarization reversed portions 101, 102, 103, 104, 105, 106, 107, 108, 109, and 110, and a polarization non-reversed portion 116 enables to recognize a boundary between the polarization reversed portion 101, 102, 103, 104, 105, 106, 107, 108, 109, 110, and the polarization non-reversed portion 116. By performing the above steps, it is possible to measure the positions where the duty ratio is substantially 50% in the entire length of the beam path portion.

FIG. 7 shows normals 111, 112, 113, 114, and 115 on the etched plane substantially perpendicular to Z-direction to describe the above arrangement. The normals 111 through 115 are distanced from each other at an interval of 100 μm. As is obvious from FIG. 7, the polarization reversed region 101, 108 has a duty ratio of substantially 50% in the vicinity of the normal 111. Similarly, the polarization reversed region 102, 105 has a duty ratio of substantially 50% in the vicinity of the normal 115. Similarly, the polarization reversed region 103, 109 has a duty ratio of substantially 50% in the vicinity of the normal 112. Similarly, the polarization reversed region 104, 110 has a duty ratio of substantially 50% in the vicinity of the normal 114. Similarly, the polarization reversed region 106, 107 has a duty ratio of substantially 50% in the vicinity of the normal 113.

The illustration in FIG. 7 shows that a line connecting the average values of the Z-coordinate position where the duty ratio is substantially 50% corresponds to the normal 113; and that the polarization reversed region 101, 108 has a duty ratio of substantially 50% at a position displaced from the average value by about 200 μm in +Z direction. In FIG. 7, the portion of the laser wavelength conversion element other than the polarization reversed portions 101 through 110 corresponds to the polarization non-reversed portion 116.

It is desirable to allow incidence of a fundamental wave laser beam onto the laser wavelength conversion element in such a manner that the beam path of the fundamental wave laser beam is approximated to the average value line of the Z-coordinate position where the duty ratio is substantially 50%. The above arrangement enables to maximize the average value of the wavelength conversion efficiency and uniformity in a beam section.

In the first embodiment, preferably, the wavelength conversion efficiency can be increased by subjecting an incident fundamental wave laser beam to pulse oscillation. As compared with an arrangement that CW (continuous wave) laser oscillation whose average output is substantially the same as pulse oscillation is performed, the light intensity is increased by several ten times to several hundred times in pulse oscillation. As a result, crystal degradation may occur in a low output condition. There is an increased demand for high output performance, and an effect of high output performance to be obtained by the first embodiment is significantly large.

In the case where pulse oscillation is performed, it is desirable to further increase the beam diameter in the laser wavelength conversion element. It is desirable to set the distribution width, in Z direction, of the positions where the duty ratio is substantially 50%, to 300 μm or more, and 450 μm or more so as to set the wavelength conversion efficiencies in the region where the beam diameter is 600 μm or more, and 900 μm or more, substantially uniform to each other. Further preferably, in the respective conditions, the region where the duty ratio is substantially 50% occupy 20% or more relative to the entirety of the wavelength conversion element, at the positions displaced from the average value of the Z-coordinate position where the duty ratio is substantially 50%, by 150 μm or more, and 225 μm or more in +Z direction; and the region where the duty ratio is substantially 50% occupy 20% or more relative to the entirety of the wavelength conversion element, at the positions displaced from the average value by 150 μm or more, and 225 μm or more in −Z direction.

Considering that the polarization reversed regions have wedge shapes, the above requirements mean that the duty ratio deviation is 30% or more, or 45% or more on the center of a beam path corresponding to the optical axis; and that the region having a duty ratio smaller than the average duty ratio on the center beam path by 15% or more, or 22.5% or more, and the region having a duty ratio larger than the average duty ratio on the center beam path by 15% or more, or 22.5% or more respectively occupy 20% or more relative to the entirety of the laser wavelength conversion element in the longitudinal direction thereof.

Further preferably, high-efficiency wavelength conversion may be performed by using lithium niobate or lithium tantalate as a material for a laser wavelength conversion element. Particularly preferably, a non-linear optical crystal as a laser wavelength conversion element is Mg-doped $LiTa_{(1-x)}Nb_xO_3$ ($0 \leq x \leq 1$).

The laser wavelength conversion element in the first embodiment is so constructed as to allow incidence of an infrared laser beam as a fundamental wave, and generate a green laser beam having a wavelength substantially twice as large as the wavelength of the infrared laser beam.

The infrared laser beam, as a fundamental wave to be incident onto the laser wavelength conversion element of the first embodiment, is most preferably a flat beam, considering that high output performance is obtained by using a laser beam whose light intensity is approximately or substantially uniform with respect to the entirety of a beam section.

The fundamental wave laser beam to be incident onto the laser wavelength conversion element may be a beam of lateral multimode.

It is desirable to use a laser beam whose peak light intensity in a beam section is smaller than that of a Gaussian beam having substantially the same output and beam diameter by 10% or more, as a fundamental wave source beam, because an effect of high output performance is increased by 20% or more.

In the first embodiment, laser beam wavelength conversion is performed in a state that the periodical electrode unit and the opposing electrode for forming the polarization reversed portions are formed in the laser wavelength conversion element. Alternatively, after the polarization reversed portions are formed, the periodical electrode unit and the opposing electrode may be removed from the laser wavelength conversion element.

Second Embodiment

Figure 8:
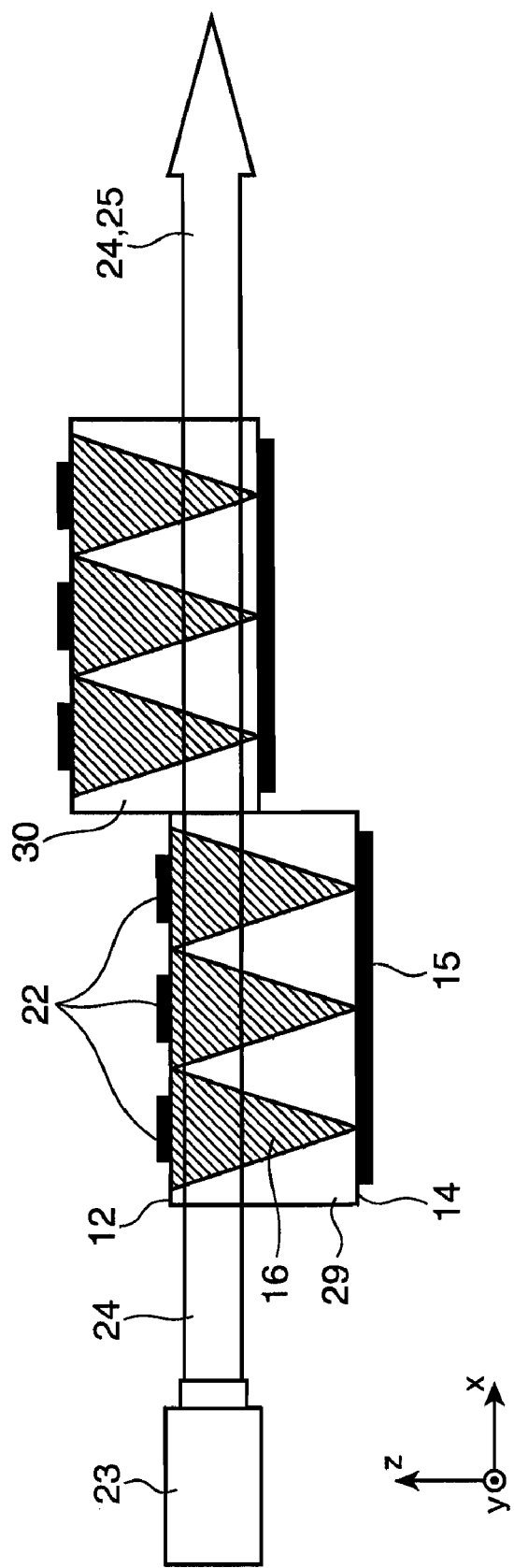
FIG. 8 is a diagram showing an arrangement of a laser wavelength conversion device in accordance with a second embodiment of the invention.

FIG. 8 is a diagram showing an arrangement of a laser wavelength conversion device in accordance with the second embodiment of the invention. In the second embodiment, as shown in FIG. 8, there are used at least two laser wavelength conversion elements 29 and 30, which have been fabricated by setting an intensity of an electric field to be applied between a periodical electrode unit and an opposing electrode, a temperature, and an application time to a fixed value, wherein the first laser wavelength conversion element 29 and the second laser wavelength conversion element 30 are displaced from each other in Z direction of a crystal. In this arrangement, the relations between a distance of a beam path of a fundamental wave laser beam 24 to be incident onto the first laser wavelength conversion element 29 from a +Z surface 12, and a wavelength conversion efficiency is substantially the same as the relations in the first embodiment shown in FIG. 2.

As shown in FIG. 8, the laser wavelength conversion device in the second embodiment includes the first laser wavelength conversion element 29 and the second laser wavelength conversion element 30. A periodical electrode unit 22 is formed on the +Z surface 12 of the first laser wavelength conversion element 29, and an opposing electrode 15 is formed on a −Z surface 14 thereof. The arrangement of the second laser wavelength conversion element 30 is identical to that of the first laser wavelength conversion element 29.

Distal ends of polarization reversed portions 16 to be formed at a position beneath periodical electrodes of the periodical electrode unit 22 reach the opposing electrode 15. When a control voltage is applied by an unillustrated pulse generator between the periodical electrode unit 22 and the opposing electrode 15, polarization reversed regions are formed in a ferroelectric portion between the periodical electrode unit 22 and the opposing electrode 15. The control voltage is a pulse voltage or a direct-current voltage having a predetermined voltage level or a predetermined energization time.

In the second embodiment, when a voltage is applied to the periodical electrode unit 22 by the pulse generator, the polarization reversed portions 16 are formed at a position beneath the periodical electrodes of the periodical electrode unit 22. When the distal ends of the polarization reversed portions 16 to be formed at a position beneath the periodical electrodes of the periodical electrode unit 22 reach the opposing electrode 15, the voltage application is ended. Thus, the wedge-shaped polarization reversed portions 16 extending in the polarization direction are formed.

The first laser wavelength conversion element 29 and the second laser wavelength conversion element 30 formed with the polarization reversed portions are arranged side by side in the optical axis direction in a state that the first laser wavelength conversion element 29 and the second laser wavelength conversion element 30 are displaced from each other in the polarization direction.

Figure 9:
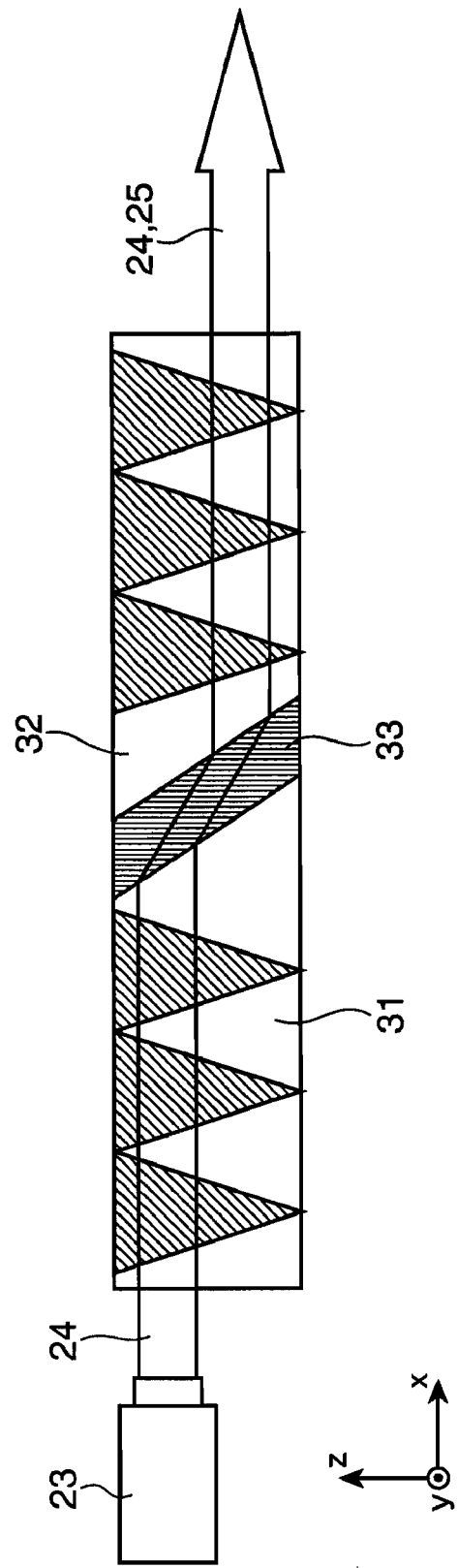
FIG. 9 is a diagram showing an arrangement of a laser wavelength conversion device as a modification of the second embodiment.

Alternatively, as shown in FIG. 9, a region 33 having a refractive index different from the refractive index of a first laser wavelength conversion element 31 and a second laser wavelength conversion element 32 may be formed at a connecting portion between the first laser wavelength conversion element 31 and the second wavelength conversion element 32, in a state that the region 33 extends obliquely with respect to a beam path. The modification enables to fabricate a laser wavelength conversion element having substantially the same effect as described above, even if a laser beam passing through the first laser wavelength conversion element 31 is displaced from a laser beam passing through the second laser wavelength conversion element 32 in Z direction.

FIG. 9 is a diagram showing an arrangement of a laser wavelength conversion device as the modification of the second embodiment. As shown in FIG. 9, the laser wavelength conversion device in the modification of the second embodiment includes the first laser wavelength conversion element 31 and the second laser wavelength conversion element 32. The arrangement of the first laser wavelength conversion element 31 and the second laser wavelength conversion element 32 in the modification of the second embodiment is identical to the arrangement of the first laser wavelength conversion element 29 and the second laser wavelength conversion element 30 shown in FIG. 8.

The first laser wavelength conversion element 31 and the second laser wavelength conversion element 32 are arranged side by side in the optical axis direction. The region 33 having a refractive index different from the refractive index of the first laser wavelength conversion element 31 and the second laser wavelength conversion element 32 is formed between the first laser wavelength conversion element 31 and the second wavelength conversion element 32. A laser beam passing through upper portions of polarization reversed portions in the first laser wavelength conversion element 31 is refracted downwardly while passing through the region 33, and then passes through lower portions of polarization reversed portions in the second laser wavelength conversion element 32.

In this way, the duty ratio of the first laser wavelength conversion element 31 (the second laser wavelength conversion element 32) is fixed on a plane substantially perpendicular to the polarization direction. The first and the second laser wavelength conversion elements 31 and 32 are arranged side by side in the optical axis direction of a laser beam, with the duty ratios thereof being different from each other on a beam path of a fundamental wave laser beam passing through the first and the second wavelength conversion elements 31 and 32.

As described above, since the first and the second laser wavelength conversion elements 31 and 32 whose duty ratio is different from each other are arranged side by side in the optical axis direction of a laser beam, the peak positions of the wavelength conversion efficiency with which the laser beam is subjected to wavelength conversion by the polarization reversed portions can be displaced in the polarization direction. Summing up the wavelength conversion efficiency to be obtained by the polarization reversed portions in the first laser wavelength conversion element 31, and the wavelength conversion efficiency to be obtained by the polarization reversed portions in the second laser wavelength conversion element 32 enables to extend the region where the wavelength conversion efficiency is substantially uniform in the polarization direction.

It is needless to say that combination of the first embodiment and the second embodiment is advantageous in obtaining substantially the same effect as described above.

In the second embodiment, combination of two laser wavelength conversion elements is used. Alternatively, combination of three or more laser wavelength conversion elements may be used.

Third Embodiment

Figure 10:
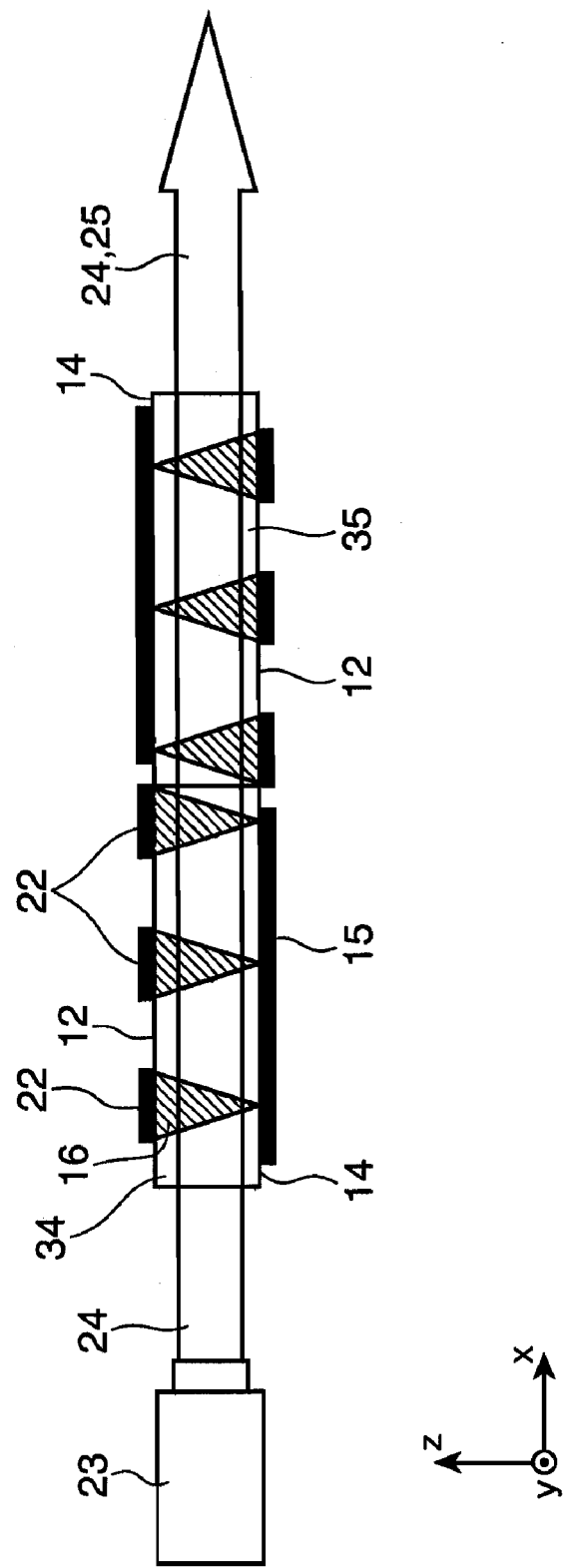
FIG. 10 is a diagram showing an arrangement of a laser wavelength conversion device in accordance with a third embodiment of the invention.

FIG. 10 is a diagram showing an arrangement of a laser wavelength conversion device in accordance with the third embodiment of the invention. In the third embodiment, a first laser wavelength conversion element 34 and a second laser wavelength conversion element 35, both of which have been fabricated in an identical condition and, each of which has a thickness of about 0.5 mm, are arranged in such a manner that a +Z surface 12 of the first laser wavelength conversion element 34 and a +Z surface 12 of the second laser wavelength conversion element 35 are opposite to each other, as shown in FIG. 10.

As shown in FIG. 10, the laser wavelength conversion device in the third embodiment includes the first laser wavelength conversion element 34 and the second laser wavelength conversion element 35. A periodical electrode unit 22 is formed on the +Z surface 12 of the first laser wavelength conversion element 34, and an opposing electrode 15 is formed on a −Z surface 14 thereof. The arrangement of the second laser wavelength conversion element 35 is identical to the arrangement of the first laser wavelength conversion element 34.

Distal ends of polarization reversed portions 16 to be formed at a position beneath periodical electrodes of the periodical electrode unit 22 reach the opposing electrode 15. When a control voltage is applied by an unillustrated pulse generator between the periodical electrode unit 22 and the opposing electrode 15, polarization reversed regions are formed in a ferroelectric portion between the periodical electrode unit 22 and the opposing electrode 15. The control voltage is a pulse voltage or a direct-current voltage having a predetermined voltage level or a predetermined energization time.

The first laser wavelength conversion element 34 and the second laser wavelength conversion element 35 are arranged side by side in the optical axis direction in a state that the +Z surface 12 of the first laser wavelength conversion element 34 is contiguous to a −Z surface 14 of the second laser wavelength conversion element 35.

In the above arrangement, the wavelength conversion efficiencies are substantially uniform in the first laser wavelength conversion element 34 and the second laser wavelength conversion element 35, irrespective of the distance between the incident position of a fundamental wave laser beam, and the +Z surface 12. Also, as compared with the first and the second embodiments, the quantity of a non-linear crystal to be used in wavelength conversion is small in the third embodiment.

In the third embodiment, combination of two laser wavelength conversion elements is used. Alternatively, combination of three or more laser wavelength conversion elements may be used.

Fourth Embodiment

Figure 11:
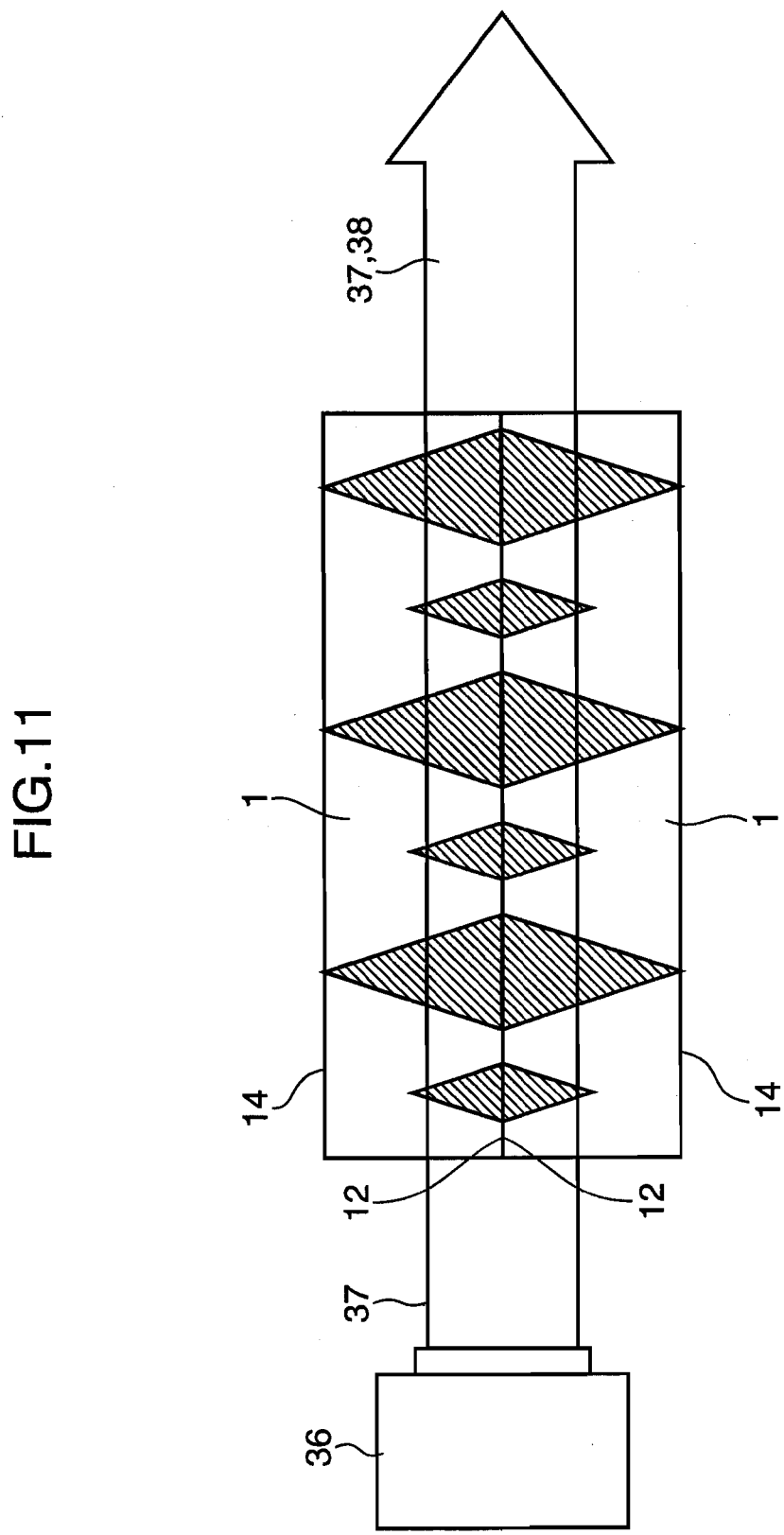
FIG. 11 is a diagram showing an arrangement of a laser wavelength conversion device in accordance with a fourth embodiment of the invention.

FIG. 11 is a diagram showing an arrangement of a laser wavelength conversion device in accordance with the fourth embodiment of the invention. In the fourth embodiment, two identical laser wavelength elements 1 described in the first embodiment (see FIG. 1) are used. A +Z surface 12 of each of the two laser wavelength conversion elements 1 is polished, and the two laser wavelength conversion elements 1 are arranged in such a manner that the +Z surfaces 12 thereof are contacted to each other.

As shown in FIG. 11, the laser wavelength conversion device in the fourth embodiment includes the two laser wavelength conversion elements 1. The two laser wavelength conversion elements 1 are arranged one over the other in the polarization direction in a state that the +Z surfaces 12 thereof are contacted to each other.

In the above arrangement, the region, in the vertically arranged laser wavelength conversion elements 1, where the wavelength conversion efficiency is substantially uniform, is contiguous. Accordingly, the width of the jointed region where the wavelength conversion efficiency is substantially uniform is about 1 mm in Z direction. As compared with the arrangement of the laser wavelength conversion device incorporated with the single laser wavelength conversion element, as described in the first embodiment, the above arrangement enables to increase the beam diameter of a laser beam by about two times. A fundamental wave laser beam 37 of about 1 mm in beam diameter, which has been generated by a fundamental wave laser light source 36, is converted into a laser beam 38 having a wavelength different from the wavelength of the fundamental wave laser beam 37 by the two laser wavelength conversion elements 1.

The duty ratios of the at least two laser wavelength conversion elements 1 are not fixed on a plane substantially perpendicular to the polarization direction. The at least two laser wavelength conversion elements 1 are arranged one over the other in the polarization direction. Arranging the laser wavelength conversion elements 1 one over the other in the polarization direction enables to increase the beam diameter of a laser beam, as compared with the arrangement of using a single laser wavelength conversion element.

Fifth Embodiment

Figure 12:
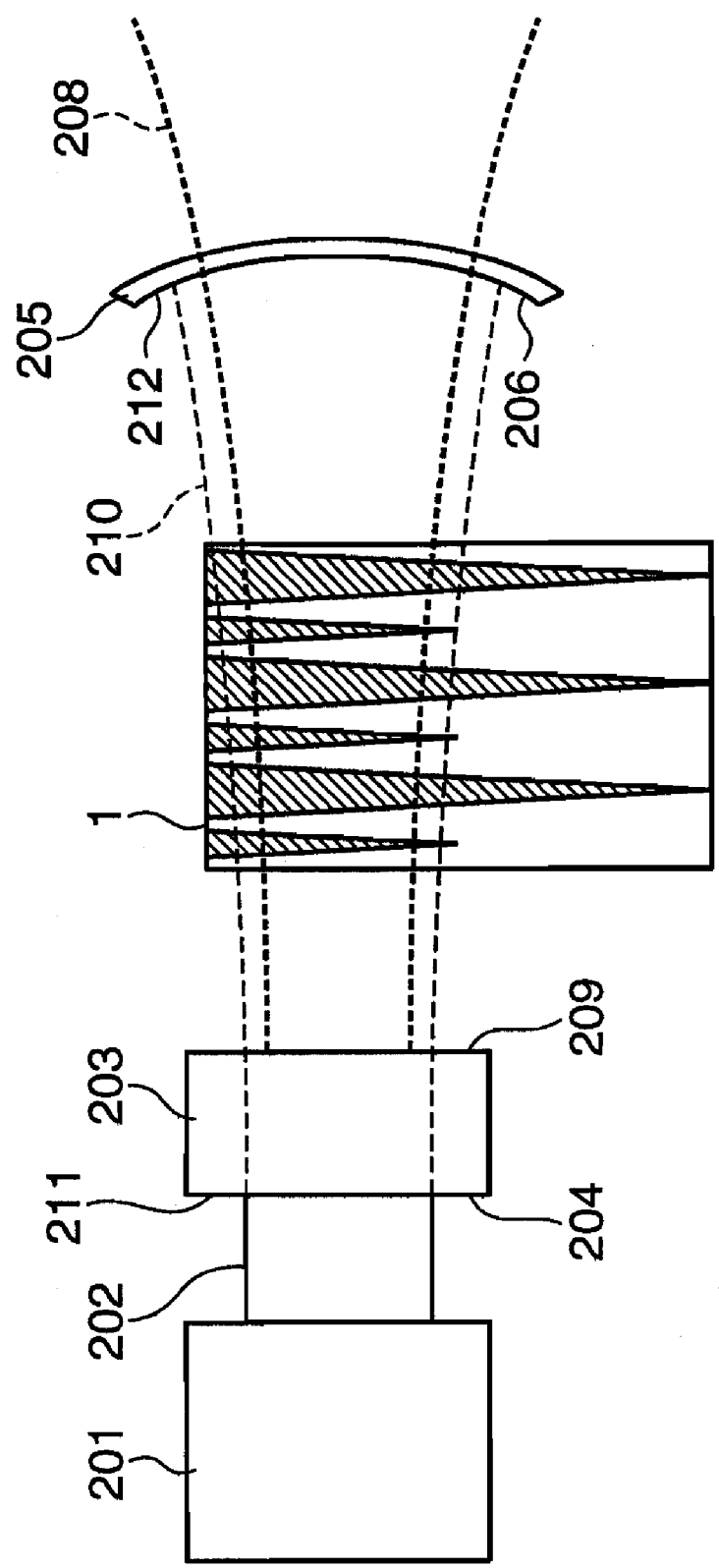
FIG. 12 is diagram showing an arrangement of a laser wavelength conversion device in accordance with a fifth embodiment of the invention.

In the fifth embodiment, described is a resonator-based laser wavelength conversion device incorporated with the laser wavelength conversion element described in the first embodiment. FIG. 12 is a diagram showing an arrangement of the laser wavelength conversion device in the fifth embodiment. The laser wavelength conversion device shown in FIG. 12 includes a laser wavelength conversion element 1, a solid-state laser element 203, and a concave mirror 205.

As shown in FIG. 12, in the fifth embodiment, a semiconductor laser chip 201 generates a laser beam 202 of 809 nm wavelength. The solid-state laser element 203 made of Nd:YVO$_4$ is excited by the laser beam 202 of 809 nm wavelength to be generated by the semiconductor laser chip 201 to emit a laser beam 210 of 1,064 nm wavelength. An HR coat (high reflection coat) 211, as a first reflection layer, capable of reflecting light of 1,064 nm wavelength is applied to an incident surface 204 of the solid-state laser element 203. An HR coat 212, as a second reflection layer, capable of reflecting light of 1,064 nm wavelength is applied to an inner surface 206 of the concave mirror 205. In this arrangement, the laser beam is resonated between the HR coats 211 and 212.

The laser wavelength conversion element 1 described in the first embodiment is arranged between the concave mirror 205 and the solid-state laser element 203. A laser beam 208 of 532 nm wavelength is obtained by the laser wavelength conversion element 1. An AR (anti-reflective) coat against reflection of light of 1,064 nm wavelength is applied to an exit surface 209 of the solid-state laser element 203, and both end surfaces of the laser wavelength conversion element 1, as a laser beam incident surface and a laser beam exit surface. An HR coat capable of reflecting light of 532 nm wavelength is applied to the exit surface 209 of the solid-state laser element 203. An AR coat against reflection of light of 809 nm wavelength is applied to the incident surface 204 of the solid-state laser element 203. An AR coat against light of 532 nm wavelength is applied to both end surfaces of the concave mirror 205, as a laser beam incident surface and a laser beam exit surface.

The laser wavelength conversion device incorporated with a laser resonator is operable to perform high-efficiency wavelength conversion. However, the light intensity in the laser wavelength conversion element 1 may likely increase, and a thermal lens may be generated by light intensity increase in the solid-state laser element 203 to be used as a fundamental wave laser light source. In view of this, there is a high demand for increasing the beam diameter in the laser wavelength conversion element 1 or the solid-state laser element 203. Therefore, use of the laser wavelength conversion element 1 of the fifth embodiment is advantageous in providing a laser wavelength conversion device with high-output performance.

Alternatively, a fundamental wave laser beam may be allowed to be incident onto the laser wavelength conversion element 1 at Brewster's angle. The modification eliminates the need of applying an AR coat against reflection of light of 1,064 nm wavelength to both end surfaces of the laser wavelength conversion element 1. This arrangement enables to suppress loss of a fundamental wave laser beam in the laser resonator, thereby leading to high-efficiency performance. The above arrangement enables to increase the beam diameter in the laser wavelength conversion element 1 in Z direction by about two times. Thus, there is a highest demand for increasing a wavelength conversion region by using the laser wavelength conversion element 1 of the fifth embodiment.

In the case where an infrared laser beam is subjected to wavelength conversion into a green laser beam, the maximum output of a green laser beam to be generated is increased by four times, nine times, or sixteen times by increasing the beam diameter of the infrared laser beam to be used in wavelength conversion from about 150 μm, as a conventional size, to about 300 μm, or to about 450 μm, or to about 600 μm.

Unlike the conventional arrangement, in which crystal damage may have occurred when the output exceeds 2 watts or more, the above arrangement enables to generate a 8-watt green laser beam, necessary for laser projector, generate a green laser beam of about 18 watts, necessary for laser liquid display, or generate a green laser beam of about 30 watts, necessary for laser processing.

In view of the above, it is desirable to set the wavelength conversion efficiencies in the region where the fundamental wave laser beams with the beam diameter of 300 μm or more, 450 μm or more, and 600 μm or more are allowed to be incident, substantially uniform to each other, and to set distribution widths, in Z direction, of the positions where the duty ratio is substantially 50%, to 150 μm or more, 225 μm or more, and 300 μm or more, respectively. In the aforementioned conditions, it is desirable that the region having the duty ratio of substantially 50% occupy 20% or more relative to the entirety of the wavelength conversion element, at the positions displaced from the average value of the Z-coordinate where the duty ratio is substantially 50% in +Z direction by 75 μm, 112.5 μm, and 150 μm or more, respectively. Likewise, it is desirable that the region having the duty ratio of substantially 50% occupy 20% or more relative to the entirety of the wavelength conversion element, at the positions displaced from the average value in −Z direction by 75 μm, 112.5 μm, and 150 μm or more, respectively.

Sixth Embodiment

Figure 13:
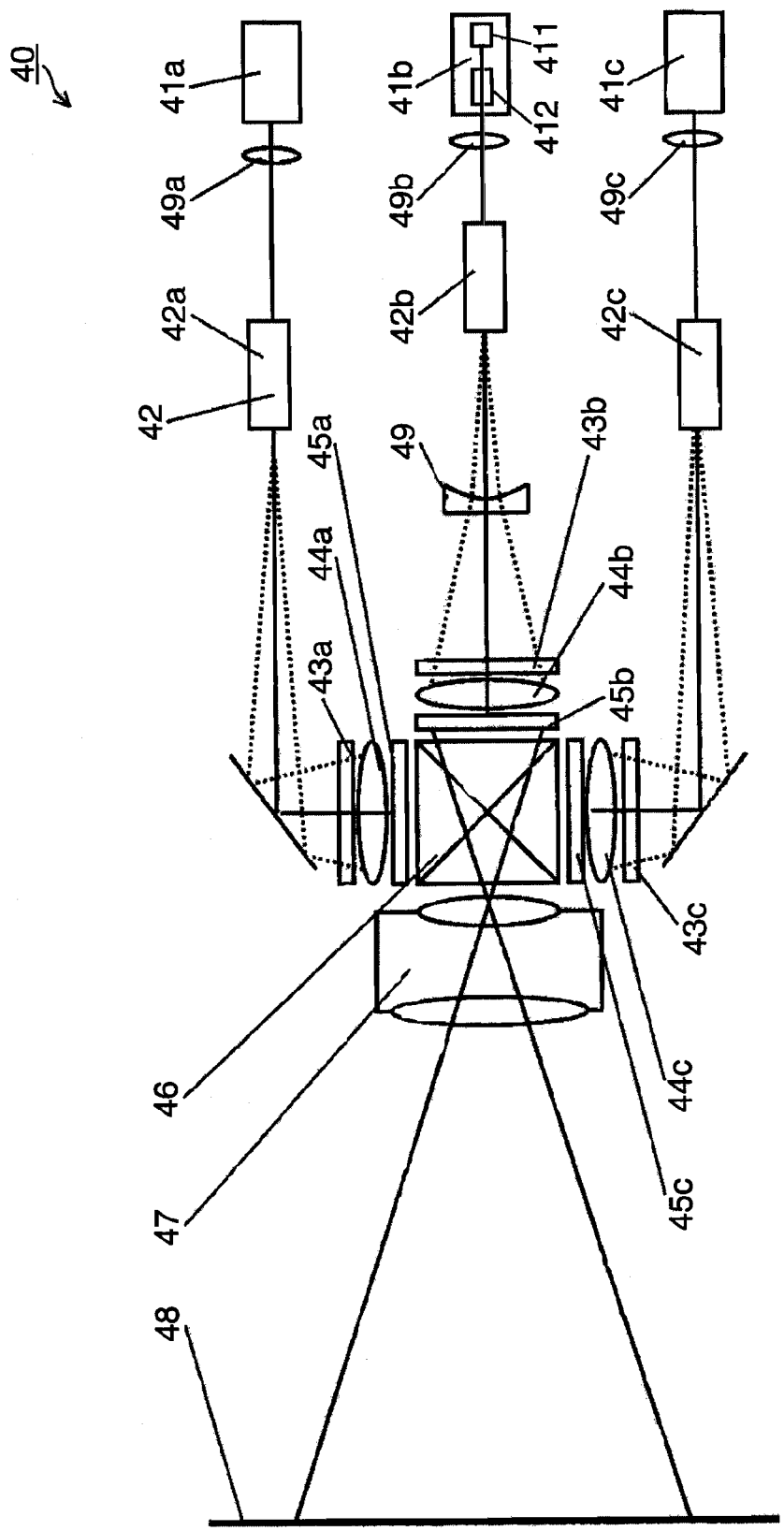
FIG. 13 is a diagram schematically showing an example of an arrangement of an image display device as the sixth embodiment of the invention, to which the laser wavelength conversion device of the first, the second, the third, the forth, or the fifth embodiment is applied.

FIG. 13 is a diagram schematically showing an example of an arrangement of an image display device as the sixth embodiment of the invention, to which the laser wavelength conversion device of the first, the second, the third, the forth, or the fifth embodiment is applied. As a light source, there are provided laser light sources 41a, 41b, and 41c for emitting laser beams of three different colors of red, green, and blue. An AlGaInP/GaAs-based semiconductor laser device for emitting laser beams of 640 nm wavelength is used as the red laser light source 41a. A GaN-based semiconductor laser device for emitting laser beams of 450 nm wavelength is used as the blue laser light source 41c. The Green laser light source 41b includes a fundamental wave laser light source 411 for emitting infrared laser beams as a fundamental wave laser light, and a laser wavelength conversion device 412 for reducing the wavelength of the infrared laser beam by one-half to emit laser beams of 530 nm wavelength. The laser wavelength conversion device 412 is constituted by using the laser wavelength conversion device described in the first, the second, the third, the fourth, or the fifth embodiment.

As shown in FIG. 13, an image display device 40 as the sixth embodiment includes the laser light sources 41a, 41b, and 41c, and reflective two-dimensional beam scanners 42a, 42b, and 42c for scanning the laser beams emitted from the laser light sources 41a, 41b, and 41c. The laser light sources 41a, 41b, and 41c emit at least red, green, and blue laser beams, respectively.

In the following, an arrangement of an optical system for forming an image with use of the laser light sources of the image display device 40 as the sixth embodiment is described. Laser beams of red, green, and blue emitted from the laser light sources 41a, 41b, and 41c of the image display device 40 are condensed on condenser lenses 49a, 49b, and 49c, and then scanned on diffusers 43a, 43b, and 43c through the reflective two-dimensional beam scanners 42a, 42b, and 42c, respectively.

The laser beams diffused by the diffusers 43a, 43b, and 43c are incident onto space modulating elements 45a, 45b, and 45c after convergence on field lenses 44a, 44b, and 44c, respectively. Image data is divided into red image data, green image data, and blue image data, and the individual data are inputted to the space modulating elements 45a, 45b, and 45c, respectively. The laser beams modulated by the space modulating elements 45a, 45b, and 45c are synthesized into a color image by a dichroic prism 46. The synthesized color image is projected onto a screen 48 by a projection lens 47. There is provided a concave lens 49 on an optical path from the green laser light source 41b to the space modulating element 45b for making the spot size of a green laser beam on the space modulating element 45b substantially identical to the spot size of a red laser beam or a blue laser beam.

As described above, the image display device 40 of the sixth embodiment enables to extend the beam diameter of the incident beam and the laser beam to be generated by wavelength conversion, by using the laser wavelength conversion device described in the first, the second, the third, the fourth, or the fifth embodiment in the laser light source. This enables to perform high-output wavelength conversion without causing crystal damage.

Seventh Embodiment

Figure 14:
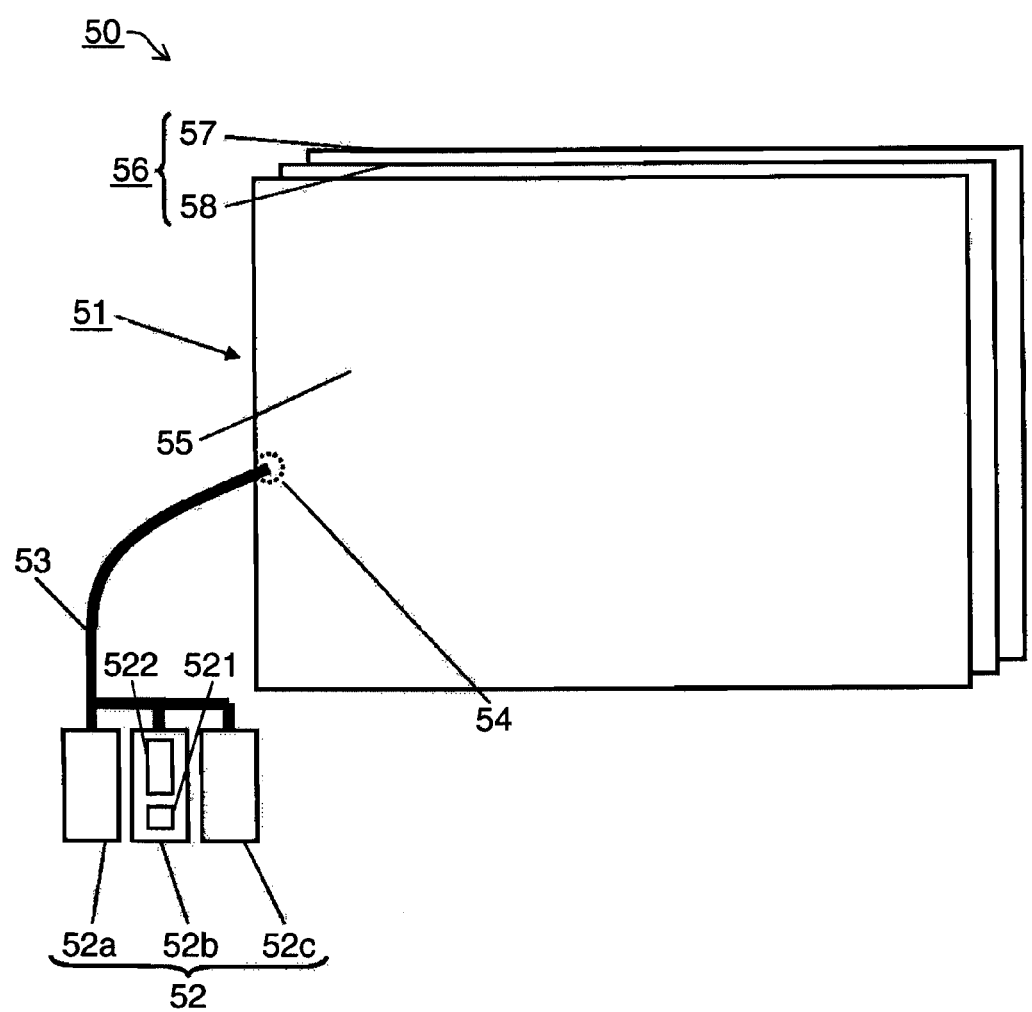
FIG. 14 is a diagram schematically showing an example of an arrangement of an image display device as the seventh embodiment, to which a backlight illuminator incorporated with the laser wavelength conversion device of the first, the second, the third, the fourth, or the fifth embodiment is applied.
Figure 15:
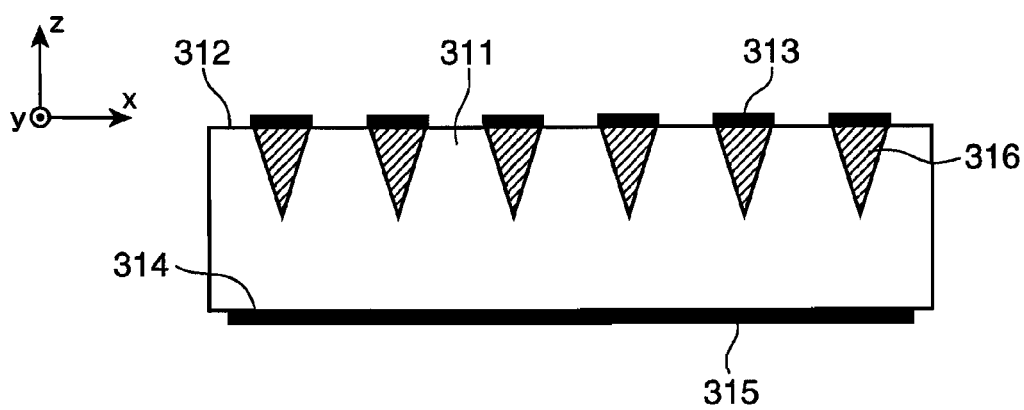
FIG. 15 is a diagram for describing a process of forming a periodically polarization reversed structure in a conventional laser wavelength conversion element.

FIG. 14 is a diagram schematically showing an example of an arrangement of an image display device as the seventh embodiment, to which a backlight illuminator incorporated with the laser wavelength conversion device of the first, the second, the third, the fourth, or the fifth embodiment is applied. FIG. 14 is a diagram schematically showing an arrangement of a liquid crystal display device 50, as an example of the image display device.

As shown in FIG. 14, the liquid crystal display device 50 includes a liquid crystal display panel 56, and a backlight illuminator 51 for illuminating the liquid crystal display panel 56 from the backside. The backlight illuminator 51 includes multiple laser light sources 52. The laser light sources 52 include light sources for emitting laser beams of at least red, green, and blue, respectively. Specifically, the laser light sources 52 are constituted of a red laser light source 52a for emitting red laser beams, a green laser light source 52b for emitting green laser beams, and a blue laser light source 52c for emitting blue laser beams.

In this embodiment, an AlGaInP/GaAs-based semiconductor laser device for emitting laser beams of 640 nm wavelength is used as the red laser light source 52a. A GaN-based semiconductor laser device for emitting laser beams of 450 nm wavelength is used as the blue laser light source 52c. The green laser light source 52b includes a fundamental wave laser light source 521 for emitting infrared laser beams as a fundamental wave laser light, and a laser wavelength conversion device 522 for reducing the wavelength of the infrared laser beam by one-half to emit laser beams of 530 nm wavelength. The laser wavelength conversion device 522 is constituted by using the laser wavelength conversion device described in the first, the second, the third, the fourth, or the fifth embodiment.

In the following, the arrangement of the liquid crystal display device 50 of the seventh embodiment is further described. The liquid crystal display panel 56 includes a polarizing plate 57 for displaying an image by utilizing the red, green, and blue laser beams emitted from the backlight illuminator 51, and a liquid crystal plate 58. The backlight illuminator 51 of the seventh embodiment shown in FIG. 14 includes the laser light sources 52, an optical fiber 53 for collectively guiding the red, green, and blue laser beams from the laser light sources 52 to a light guiding plate 55 via a light guider 54, and the light guiding plate 55 for emitting red, green, and blue laser beams from a principal plane (not shown) where the red, green, and blue laser beams introduced from the light guider 54 and uniformly collected.

As described above, the liquid crystal display device 50 of the seventh embodiment enables to extend the beam diameter of the incident beam and the laser beam to be generated by wavelength conversion, by using the laser wavelength conversion device described in the first, the second, the third, the fourth, or the fifth embodiment in the laser light source of the backlight illuminator 51. This enables to perform high-output wavelength conversion without causing crystal damage.

The above embodiments and/or modifications primarily include the inventions having the following arrangements.

A laser wavelength conversion device according to an aspect of the invention comprises: a laser wavelength conversion element for allowing incidence of a laser beam as a fundamental wave to convert a part of the fundamental wave laser beam into a wavelength-converted laser beam having a wavelength different from a wavelength of the fundamental wave laser beam, wherein the laser wavelength conversion element includes a non-linear optical crystal having periodically polarization reversed portions, and the polarization reversed portions are formed in such a manner that a region where a wavelength conversion efficiency is substantially uniform extends in a polarization direction of the non-linear optical crystal, the incident laser beam being converted into the wavelength-converted laser beam with the wavelength conversion efficiency.

In the above arrangement, the polarization reversed portions are formed in such a manner that the region where the wavelength conversion efficiency with which the incident laser beam is converted into the wavelength-converted laser beam is substantially uniform extends in the polarization direction of the non-linear optical crystal. This enables to extend the beam diameter of the incident beam and the laser beam to be generated by wavelength conversion, thereby enabling to perform high-output wavelength conversion without causing crystal damage. In particular, in the case where a green laser beam is obtained by subjecting an infrared laser beam to wavelength conversion, the above arrangement enables to prevent generation of an ultraviolet laser beam and suppress absorption of a green laser beam, which is advantageous in realizing high-efficiency wavelength conversion.

In the laser wavelength conversion device, preferably, the polarization reversed portions may be formed in such a manner that positions where the wavelength conversion efficiency is maximum are distributed in the polarization direction of the non-linear optical crystal with respect to a beam path of the incident beam passing through the non-linear optical crystal.

In the above arrangement, the positions, where the wavelength conversion efficiency with which the incident laser beam is converted into the wavelength-converted laser beam is maximum, are distributed in the polarization direction of the non-linear optical crystal with respect to the beam path of the incident beam passing through the non-linear optical crystal. This enables to extend the region where the wavelength conversion efficiency is substantially uniform in the polarization direction.

In the laser wavelength conversion device, preferably, the polarization reversed portions may be formed in such a manner that positions where a duty ratio is substantially 50% are distributed in the polarization direction of the non-linear optical crystal with respect to the beam path of the incident beam passing through the non-linear optical crystal, the duty ratio representing a ratio of the polarization reversed portions relative to an entirety of the non-linear optical crystal in an optical axis direction of the laser beam.

In the above arrangement, the positions where the duty ratio, representing the ratio of the polarization reversed portions relative to the entirety of the non-linear optical crystal in the optical axis direction of the laser beam, is substantially 50% are distributed in the polarization direction of the non-linear optical crystal with respect to the beam path of the incident beam passing through the non-linear optical crystal. This enables to extend the region where the wavelength conversion efficiency is substantially uniform in the polarization direction.

In the laser wavelength conversion device, preferably, the duty ratio of the laser wavelength conversion element may be unfixed on a plane substantially perpendicular to the polarization direction of the non-linear optical crystal.

In the above arrangement, since the duty ratio of the laser wavelength conversion element is not fixed on the plane substantially perpendicular to the polarization direction of the non-linear optical crystal, the peak position of the wavelength conversion efficiency with which the incident laser beam is converted into the wavelength-converted laser beam by the polarization reversed portions can be displaced. Summing up the wavelength conversion efficiencies whose peak position is displaced from each other enables to extend the region where the wavelength conversion efficiency is substantially uniform in the polarization direction.

In the laser wavelength conversion device, preferably, the laser wavelength conversion element may include a plurality of laser wavelength conversion elements, the duty ratio of each of the laser wavelength conversion elements being fixed on a plane substantially perpendicular to the polarization direction, and the laser wavelength conversion elements may be aligned in the optical axis direction of the laser beam in a state that the duty ratios of the laser wavelength conversion elements are different from each other on the beam path of the fundamental wave laser beam passing through the laser wavelength conversion element.

In the above arrangement, the duty ratio of each of the laser wavelength conversion elements is fixed on the plane substantially perpendicular to the polarization direction. The laser wavelength conversion elements are aligned in the optical axis direction of the laser beam in a state that the duty ratios of the laser wavelength conversion elements are different from each other on the beam path of the fundamental wave laser beam passing through the laser wavelength conversion elements.

As described above, since the laser wavelength conversion elements whose duty ratio is different from each other are aligned in the optical axis direction of a laser beam, the peak position of the wavelength conversion efficiency with which the incident laser beam is converted into the wavelength-converted laser beam by the polarization reversed portions can be displaced. Summing up the wavelength conversion efficiencies whose peak position is displaced from each other enables to extend the region where the wavelength conversion efficiency is substantially uniform in the polarization direction.

In the laser wavelength conversion device, preferably, the laser wavelength conversion element may include at least two laser wavelength conversion elements, the duty ratio of each of the laser wavelength conversion elements being unfixed on a plane substantially perpendicular to the polarization direction, and the at least two laser wavelength conversion elements are arranged one over the other in the polarizing direction.

In the above arrangement, the duty ratio of each of the at least two laser wavelength conversion elements is not fixed on the plane substantially perpendicular to the polarization direction. The at least two laser wavelength conversion elements are arranged one over the other in the polarizing direction. Arranging the laser wavelength conversion elements one over the other in the polarization direction enables to further increase the beam diameter of a laser beam, as compared with an arrangement of using a single laser wavelength conversion element.

In the laser wavelength conversion device, preferably, the laser wavelength conversion element may allow incidence of a pulse-oscillated laser beam. This arrangement enables to increase the wavelength conversion efficiency by using the pulse-oscillated laser beam.

In the laser wavelength conversion device, preferably, the non-linear optical crystal may contain Mg-doped $LiTa_{(1-x)}Nb_xO_3$ ($0 \leq x \leq 1$). This arrangement enables to use Mg-doped $LiTa_{(1-x)}Nb_xO_3$ ($0 \leq x \leq 1$), as the non-linear optical crystal.

In the laser wavelength conversion device, preferably, the laser wavelength conversion element may be operable to allow incidence of an infrared laser beam, as the fundamental wave, and generate a green laser beam having the wavelength substantially twice as large as the wavelength of the infrared laser beam.

In the above arrangement, since the green laser beam is generated based on the infrared laser beam, the laser wavelength conversion element can be used in a laser projector, a laser liquid crystal display, or a like device.

In the laser wavelength conversion device, preferably, the fundamental wave laser beam to be incident onto the laser wavelength conversion element may have a beam diameter of 200 µm or more.

In the above arrangement, by setting the beam diameter of the fundamental wave laser beam to be incident onto the laser wavelength conversion element to 200 µm or more, it is possible to generate a green laser beam, which is required for laser projector, generate a green laser beam, which is required for laser liquid crystal display, or generate a green laser beam, which is required for laser processing.

In the laser wavelength conversion device, preferably, the fundamental wave laser beam to be incident onto the laser wavelength conversion element may be a beam of lateral multimode. This arrangement enables to use the beam of lateral multimode, as the fundamental wave laser beam to be incident onto the laser wavelength conversion element.

In the laser wavelength conversion device, preferably, the region having the duty ratio of substantially 50% may occupy 20% or more relative to the entirety of the non-linear optical crystal at a position displaced from an average position obtained by averaging the region where the duty ratio is substantially 50% in the polarizing direction, by 50 µm or more toward a first plane where the polarization reversed portions are started to be formed, and the region having the duty ratio of substantially 50% may occupy 20% or more relative to the entirety of the non-linear optical crystal at a position displaced from the average position by 50 µm or more toward a second plane opposing to the first plane.

In the above arrangement, the region having the duty ratio of substantially 50% occupies 20% or more relative to the entirety of the non-linear optical crystal at the position displaced from the average position obtained by averaging the positions where the duty ratio is substantially 50% in the polarizing direction, by 50 µm or more toward the first plane where the polarization reversed portions are started to be formed. Also, the region having the duty ratio of substantially 50% occupies 20% or more relative to the entirety of the non-linear optical crystal at the position displaced from the average position by 50 µm or more toward the second plane opposing to the first plane. This enables to make the wavelength conversion efficiency substantially uniform in the polarization direction of the laser beam passing through the laser wavelength conversion element.

In the laser wavelength conversion device, preferably, the polarization reversed portions having the duty ratio smaller than an average value of the duty ratio by 5% or more, and the polarization reversed portions having the duty ratio larger than the average value of the duty ratio by 5% or more respectively may occupy 20% or more relative to the polarization reversed portions in the laser wavelength conversion element in a longitudinal direction thereof, on the beam path of the fundamental wave laser beam passing through the laser wavelength conversion element.

In the above arrangement, the polarization reversed portions having the duty ratio smaller than the average value of the duty ratio by 5% or more, and the polarization reversed portions having the duty ratio larger than the average value of the duty ratio by 5% or more respectively occupy 20% or more relative to the polarization reversed portions in the laser wavelength conversion element in the longitudinal direction thereof, on the beam path of the fundamental wave laser beam passing through the laser wavelength conversion element. This enables to make the wavelength conversion efficiency substantially uniform in the polarization direction of the laser beam passing through the laser wavelength conversion element.

In the laser wavelength conversion device, preferably, the laser wavelength conversion element may be operable to allow incidence of the fundamental wave laser beam in such a manner that the beam path of the fundamental wave laser beam passing through the laser wavelength conversion element is approximated to a line connecting an average value of the positions where the duty ratio is substantially 50% in the polarization direction.

In the above arrangement, the fundamental wave laser beam is allowed to be incident onto the laser wavelength conversion element in such a manner that the beam path of the fundamental wave laser beam passing through the laser wavelength conversion element is approximated to the line connecting the average value of the positions where the duty ratio is substantially 50% in the polarization direction. This enables to maximize the average value of the wavelength conversion efficiency, and uniformity in a beam section.

Preferably, the laser wavelength conversion device may further comprise: a first reflection layer, formed on an incident side of the laser wavelength conversion element, for reflecting at least the fundamental wave laser beam, and a second reflection layer, formed on an exit side of the laser wavelength conversion element, for reflecting at least the fundamental wave laser beam.

In the above arrangement, the laser beam is resonated between the first reflection layer formed on the incident side of the laser wavelength conversion element, and the second reflection layer formed on the exit side of the laser wavelength conversion element. This enables to perform high-efficiency wavelength conversion. Use of the laser wavelength conversion element enables to increase the beam diameter of the incident beam and the laser beam to be generated by wavelength conversion, and perform high-output wavelength conversion without causing crystal damage.

In the laser wavelength conversion device, preferably, the fundamental wave laser beam may be incident onto the laser wavelength conversion element at an incident angle corresponding to Brewster's angle. In this arrangement, since the fundamental wave laser beam is allowed to be incident onto the laser wavelength conversion element at Brewster's angle, loss of the fundamental wave laser beam in the laser wavelength conversion device can be suppressed, thereby enabling to realize high-efficiency wavelength conversion.

A method for forming a polarization reversed structure, according to another aspect of the invention, comprises: an electrode forming step of periodically forming a plurality of electrodes on one surface of a single-polarized non-linear optical crystal, and forming a plane electrode on the other surface thereof; and a polarization reversed structure forming step of forming a polarization reversed structure immediately below each of the periodical electrodes by applying an electric field between the periodical electrodes and the plane electrode, wherein in the polarization reversed structure forming step, at least one of an intensity of the electric field to be applied between the periodical electrodes and the plane electrode, an application time, and a crystal forming temperature during the electric field application is independently controlled.

In the above arrangement, the periodical electrodes are formed on the one surface of the single-polarized non-linear optical crystal, and the plane electrode is formed on the other surface thereof. The polarization reversed structure is formed immediately below the periodical electrodes by applying the electric field between the periodical electrodes and the plane electrode. At least one of the intensity of the electric field to be applied between the periodical electrodes and the plane electrode, the application time, and the crystal forming temperature during the electric field application is independently controlled.

As described above, at least one of the intensity of the electric field to be applied between the periodical electrodes and the plane electrode, the application time, and the crystal forming temperature during the electric field application is independently controlled. This enables to form polarization reversed portions whose length is different from each other, and distribute positions where a wavelength conversion efficiency with which an incident laser beam is converted into a wavelength-converted laser beam is maximum, in a polarization direction of a laser wavelength conversion element with respect to a beam path of the incident beam passing through a non-linear optical crystal.

An image display device according to yet another aspect of the invention comprises: a screen; a laser light source; and an optical system for forming an image on the screen by using the laser light source, wherein the laser light source includes a fundamental wave laser light source for emitting a fundamental wave laser beam, and the aforementioned laser wavelength conversion device for converting a part of the fundamental wave laser beam to be emitted from the fundamental wave laser light source into the laser beam having a wavelength different from a wavelength of the fundamental wave laser beam.

In the above arrangement, the polarization reversed portions are formed in such a manner that the region where the wavelength conversion efficiency with which the incident laser beam is converted into the wavelength-converted laser beam is substantially uniform extends in the polarization direction of the non-linear optical crystal. This enables to provide an image display device that is operable to increase the beam diameter of the incident beam and the laser beam to be generated by wavelength conversion, and perform high-output wavelength conversion without causing crystal damage.

An image display device according to still another aspect of the invention comprises: a liquid crystal display panel; and a backlight illuminator including a laser light source, and operable to illuminate the liquid crystal display panel from a rear surface thereof, wherein the laser light source includes a fundamental wave laser light source for emitting a fundamental wave laser beam, and the aforementioned laser wavelength conversion device for converting a part of the fundamental wave laser beam to be emitted from the fundamental wave laser light source into the laser beam having a wavelength different from a wavelength of the fundamental wave laser beam.

In the above arrangement, the polarization reversed portions are formed in such a manner that the region where the wavelength conversion efficiency with which the incident laser beam is converted into the wavelength-converted laser beam is substantially uniform extends in the polarization direction of the non-linear optical crystal. This enables to provide an image display device that is operable to increase the beam diameter of the incident beam and the laser beam to be generated by wavelength conversion, and perform high-output wavelength conversion without causing crystal damage.

The inventive laser wavelength conversion device, the inventive polarization reversed structure forming method, and the inventive image display device are advantageous in increasing the beam diameter of a laser beam and performing high-output wavelength conversion without causing crystal damage. Thus, the inventive laser wavelength conversion device, and the inventive polarization reversed structure forming method are useful as a laser wavelength conversion device incorporated with a laser wavelength conversion element, in which a polarization structure of a non-linear optical single crystal substrate is periodically reversed, and a method for forming a polarization reversed structure. In particular, in the case where e.g. a green laser beam is obtained by using an infrared laser beam as a fundamental wave, the inventive laser wavelength conversion device is useful as a compact and high-output green laser light source to be used in a backlight device of a liquid crystal TV, a projection TV, a projector, and a like device.

This application is based on Japanese Patent Application No. 2007-128919 filed on May 15, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A laser wavelength conversion device, comprising:
   a laser wavelength conversion element for allowing incidence of a laser beam as a fundamental wave to convert a part of the fundamental wave laser beam into a wavelength-converted laser beam having a wavelength different from a wavelength of the fundamental wave laser beam,
   wherein the laser wavelength conversion element includes a non-linear optical crystal having periodically polarization reversed portions,
   wherein each of the polarization reversed portions has a wedge shape,
   wherein the polarization reversed portions include:
      at least one polarization reversed portion having a first thickness in a polarization direction of the polarization reversed portions; and at least one polarization reversed portion having a second thickness in the polarization direction of the polarization reversed portions, and wherein the first thickness is different than the second thickness.

2. The laser wavelength conversion device according to claim 1, wherein
the polarization reversed portions are formed such that positions where the wavelength conversion efficiency is maximum are distributed in the polarization direction of the non-linear optical crystal with respect to a beam path of the incident beam passing through the non-linear optical crystal.

3. The laser wavelength conversion device according to claim 2, wherein
the polarization reversed portions are formed such that positions where a duty ratio is substantially 50% are distributed in the polarization direction of the non-linear optical crystal with respect to the beam path of the incident beam passing through the non-linear optical crystal, the duty ratio representing a ratio of the polarization reversed portions relative to an entirety of the non-linear optical crystal in an optical axis direction of the laser beam.

4. The laser wavelength conversion device according to claim 3, wherein
the duty ratio of the laser wavelength conversion element is unfixed on a plane substantially perpendicular to the polarization direction of the non-linear optical crystal.

5. The laser wavelength conversion device according to claim 3, wherein
the laser wavelength conversion element includes a plurality of laser wavelength conversion elements, the duty ratio of each of the laser wavelength conversion elements being fixed on a plane substantially perpendicular to the polarization direction, and
the laser wavelength conversion elements are aligned in the optical axis direction of the laser beam in a state that the duty ratios of the laser wavelength conversion elements are different from each other on the beam path of the fundamental wave laser beam passing through the laser wavelength conversion element.

6. The laser wavelength conversion device according to claim 3, wherein
the laser wavelength conversion element includes at least two laser wavelength conversion elements, the duty ratio of each of the laser wavelength conversion elements being unfixed on a plane substantially perpendicular to the polarization direction, and
the at least two laser wavelength conversion elements are arranged one over the other in the polarizing direction.

7. The laser wavelength conversion device according to claim 3, wherein
the region having the duty ratio of substantially 50% occupies 20% or more relative to the entirety of the non-linear optical crystal at a position displaced from an average position obtained by averaging the positions where the duty ratio is substantially 50% in the polarizing direction, by 50 µm or more toward a first plane where the polarization reversed portions are started to be formed, and
the region having the duty ratio of substantially 50% occupies 20% or more relative to the entirety of the non-linear optical crystal at a position displaced from the average position by 50 µm or more toward a second plane opposing to the first plane.

8. The laser wavelength conversion device according to claim 3, wherein
the polarization reversed portions having the duty ratio smaller than an average value of the duty ratio by 5% or more, and the polarization reversed portions having the duty ratio larger than the average value of the duty ratio by 5% or more respectively occupy 20% or more relative to the polarization reversed portions in the laser wavelength conversion element in a longitudinal direction thereof, on the beam path of the fundamental wave laser beam passing through the laser wavelength conversion element.

9. The laser wavelength conversion device according to claim 3, wherein
the laser wavelength conversion element is operable to allow incidence of the fundamental wave laser beam such that the beam path of the fundamental wave laser beam passing through the laser wavelength conversion element is approximated to a line connecting an average value of the positions where the duty ratio is substantially 50% in the polarization direction.

10. The laser wavelength conversion device according to claim 1, wherein
the laser wavelength conversion element allows incidence of a pulse-oscillated laser beam.

11. The laser wavelength conversion device according to claim 1, wherein
the non-linear optical crystal contains Mg-doped $LiTa_{(1-x)}Nb_xO_3$ ($0 \leq x \leq 1$).

12. The laser wavelength conversion device according to claim 1, wherein
the laser wavelength conversion element is operable to allow incidence of an infrared laser beam, as the fundamental wave, and generate a green laser beam having the wavelength substantially twice as large as the wavelength of the infrared laser beam.

13. The laser wavelength conversion device according to claim 1, wherein
the fundamental wave laser beam to be incident onto the laser wavelength conversion element has a beam diameter of 200 µm or more.

14. The laser wavelength conversion device according to claim 1, wherein
the fundamental wave laser beam to be incident onto the laser wavelength conversion element is a beam of lateral multimode.

15. The laser wavelength conversion device according to claim 1, further comprising:
a first reflection layer, formed on an incident side of the laser wavelength conversion element, for reflecting at least the fundamental wave laser beam, and
a second reflection layer, formed on an exit side of the laser wavelength conversion element, for reflecting at least the fundamental wave laser beam.

16. The laser wavelength conversion device according to claim 15, wherein
the fundamental wave laser beam is incident onto the laser wavelength conversion element at an incident angle corresponding to Brewster's angle.

17. A method for forming the laser wavelength conversion device according to claim 16, the method comprising:
an electrode forming step of periodically forming a plurality of electrodes on one surface of a single-polarized non-linear optical crystal, and forming a plane electrode on the other surface thereof; and
a polarization reversed structure forming step of forming a polarization reversed structure immediately below each of the periodical electrodes by applying an electric field between the periodical electrodes and the plane electrode, wherein in the polarization reversed structure forming step, at least one of an intensity of the electric field to be applied between the periodical electrodes and the plane electrode, an application time, and a crystal forming temperature during the electric field application is independently controlled.

18. An image display device, comprising:
a screen;
a laser light source; and
an optical system for forming an image on the screen by using the laser light source, wherein
the laser light source includes
    a fundamental wave laser light source for emitting a fundamental wave laser beam, and
    the laser wavelength conversion device of claim 1 for converting a part of the fundamental wave laser beam to be emitted from the fundamental wave laser light source into the laser beam having a wavelength different from a wavelength of the fundamental wave laser beam.

19. An image display device, comprising:
a liquid crystal display panel; and
a backlight illuminator including a laser light source, and operable to illuminate the liquid crystal display panel from a rear surface thereof, wherein
the laser light source includes
    a fundamental wave laser light source for emitting a fundamental wave laser beam, and
    the laser wavelength conversion device of claim 1 for converting a part of the fundamental wave laser beam to be emitted from the fundamental wave laser light source into the laser beam having a wavelength different from a wavelength of the fundamental wave laser beam.

20. A laser wavelength conversion element for allowing incidence of a laser beam as a fundamental wave to convert a part of the fundamental wave laser beam into a wavelength-converted laser beam having a wavelength different from a wavelength of the fundamental wave laser beam, the laser wavelength conversion element comprising:
a non-linear optical crystal having periodically polarization reversed portions,
wherein each of the polarization reversed portions has a wedge shape,
wherein the polarization reversed portions include:
    at least one polarization reversed portion having a first thickness in a polarization direction of the polarization reversed portions; and
    at least one polarization reversed portion having a second thickness in the polarization direction of the polarization reversed portions, and
wherein the first thickness is different than the second thickness.

* * * * *